(12) United States Patent
Wang et al.

(10) Patent No.: US 12,452,087 B2
(45) Date of Patent: Oct. 21, 2025

(54) DATA COMMUNICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Zongyou Wang, Shenzhen (CN); Hu Lan, Shenzhen (CN); Pan Liu, Shenzhen (CN); Yifang Shi, Shenzhen (CN); Kaiban Zhou, Shenzhen (CN); Jinsong Zhang, Shenzhen (CN); Qucheng Liu, Shenzhen (CN); Huankun Huang, Shenzhen (CN); Gengliang Zhu, Shenzhen (CN); Zhiyong Liao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 395 days.

(21) Appl. No.: 18/072,621

(22) Filed: Nov. 30, 2022

(65) Prior Publication Data

US 2023/0089134 A1 Mar. 23, 2023

Related U.S. Application Data

(63) Continuation of application No. PCT/CN2021/130209, filed on Nov. 12, 2021.

(30) Foreign Application Priority Data

Nov. 16, 2020 (CN) .......................... 202011279516.6

(51) Int. Cl.
*H04L 9/00* (2022.01)
*G06F 16/23* (2019.01)
(Continued)

(52) U.S. Cl.
CPC ............ *H04L 9/50* (2022.05); *G06F 16/2365* (2019.01); *G06F 16/27* (2019.01); *H04L 9/3297* (2013.01); *H04L 2209/56* (2013.01)

(58) Field of Classification Search
None
See application file for complete search history.

(56) References Cited

U.S. PATENT DOCUMENTS

2019/0182029 A1 6/2019 Yim et al.
2019/0207762 A1* 7/2019 Xie .......................... H04L 9/30
(Continued)

FOREIGN PATENT DOCUMENTS

CN 108200203 A 6/2018
CN 109214818 A 1/2019
(Continued)

OTHER PUBLICATIONS

Tencent Technology, ISR, PCT/CN2021/130209, Feb. 10, 2022, 3 pgs.

(Continued)

*Primary Examiner* — Richard L Bowen
(74) *Attorney, Agent, or Firm* — Morgan, Lewis & Bockius LLP

(57) ABSTRACT

Embodiments of this application provide a data communication method performed by a computer device. The method includes: receiving a statistical proof transaction list in an associated block, and recognizing a target index of a lightweight node in the statistical proof transaction list, where the statistical proof transaction list includes a plurality of statistical proof transactions, and the statistical proof transactions are obtained by encrypting transaction visible addresses corresponding to the transactions included in the associated block, and the quantities of the transaction visible addresses in the associated block; receiving associated trans- (Continued)

actions associated with the lightweight node in the associated block, and an encrypted path set, where the encrypted path set includes encrypted paths of the associated transactions and an encrypted path of the statistical proof transaction list; and determining validity of the associated transactions according to the statistical proof transaction list, the target index, and the encrypted path set.

15 Claims, 10 Drawing Sheets

(51) Int. Cl.
  *G06F 16/27* (2019.01)
  *H04L 9/32* (2006.01)

(56) References Cited

U.S. PATENT DOCUMENTS

| | | | |
|---|---|---|---|
| 2019/0213333 | A1 | 7/2019 | Williams et al. |
| 2020/0328889 | A1 | 10/2020 | Matetic et al. |

FOREIGN PATENT DOCUMENTS

| | | |
|---|---|---|
| CN | 109242500 A | 1/2019 |
| CN | 109885615 A | 6/2019 |
| CN | 110287262 A | 9/2019 |
| CN | 110708170 A | 1/2020 |
| CN | 110889729 A | 3/2020 |
| CN | 111159293 A | 5/2020 |
| CN | 111209343 A | 5/2020 |
| CN | 111242617 A | 6/2020 |
| CN | 111475575 A | 7/2020 |
| CN | 111597567 A | 8/2020 |
| CN | 111680031 A | 9/2020 |
| CN | 111680049 A | 9/2020 |
| CN | 111832079 A | 10/2020 |
| CN | 112085504 A | 12/2020 |
| WO | WO 2020165680 A1 | 8/2020 |

OTHER PUBLICATIONS

Tencent Technology, WO, PCT/CN2021/130209, Feb. 10, 2022, 5 pgs.
Tencent Technology, IPRP, PCT/CN2021/130209, May 16, 2023, 6 pgs.
Sinisa Matetic et al., "Bite: Bitcoin Lightweight Client Privacyn using Trusted Execution", IACR (International Association for Cryptologic Research), vol., Sep. 6, 2018, XP061026394, 34 pgs., Retrieved from the Internet: http://eprint.jacr.org/2018/803.pdf.
Tencent Technology, Extended European Search Report, EP21891199.8, Dec. 14, 2023, 8 pgs.

* cited by examiner

| 1 | MAC[hash(address1+m1)] |
| 2 | MAC[hash(address2+m2)] |
| 3 | MAC[hash(address3+m3)] |
| 4 | MAC[hash(address4+m4)] |
| 5 | MAC[hash(address5+m5)] |
| 6 | MAC[hash(address6+m6)] |
| ⋮ | MAC[hash(address+m⋯)] |

DATA COMMUNICATION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/130209, entitled "DATA COMMUNICATION METHOD AND APPARATUS, COMPUTER DEVICE, AND STORAGE MEDIUM" filed on Nov. 12, 2021, which claims priority to Chinese Patent Application No. 202011279516.6, filed with the State Intellectual Property Office of the People's Republic of China on Nov. 16, 2020, and entitled "DATA PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of Internet technologies, and specifically to a blockchain data communication technology.

BACKGROUND OF THE DISCLOSURE

A blockchain is an accounting technology that can implement data consistency storage, is difficult to be tampered with, and prevents repudiation, that is, a distributed ledger technology; and the blockchain needs to be jointly maintained by a plurality of parties, and use the cryptology to ensure transmission and access security. The blockchain is divided into three types: a public blockchain, a private blockchain, and a consortium blockchain.

The blockchain in the existing technology is generally a peer to peer (P2P) network formed between nodes. For example, each of a public blockchain such as bitcoin or Ethereum and a consortium blockchain such as Fabric or Tendermint is formed based on the P2P network, and nodes in the P2P network are equivalent, that is, the existing P2P network is a single-layered network.

To protect data privacy of different nodes, a data isolation service is required. After a serving node transmit a data synchronization request to a consensus node in a blockchain network, the serving node can synchronize on-chain transaction data related to the serving node from only the consensus node, and the serving node can only unconditionally trust data returned by the consensus node to the serving node. In many cases, the data transmitted by the consensus node to the serving node may be inaccurate or incomplete, that is, the data received by the serving node is invalid. Therefore, how to verify the validity of the on-chain transaction data synchronized by the serving node is a current research focus.

SUMMARY

Embodiments of this application provide a data communication method and apparatus, a computer device, and a storage medium, to verify validity of an associated transaction received by a lightweight node.

An aspect of the embodiments of this application provides a data communication method, performed by a computer device acting as a lightweight node of a blockchain data network, the method including:

receiving data from an associated block having an association with the lightweight node, the data including associated transactions that are associated with the lightweight node and that are in the associated block, and a statistical proof transaction list, the associated block including a plurality of transactions and the statistical proof transaction list, the plurality of transactions having their respective corresponding transaction visible addresses, the statistical proof transaction list including a plurality of statistical proof transactions, and the statistical proof transactions being obtained by encrypting the transaction visible addresses corresponding to the transactions, and the quantities of the transaction visible addresses in the associated block;

recognizing a target index of the lightweight node in the statistical proof transaction list;

obtaining an encrypted path set based on the associated transactions, the encrypted path set including encrypted paths of the associated transactions and an encrypted path of the statistical proof transaction list; and determining validity of the associated transactions according to the statistical proof transaction list, the target index, and the encrypted path set, the validity being used for representing accuracy and completeness of the associated transactions.

An aspect of the embodiments of this application provides a data communication method, performed by a computer device acting as a full node of a blockchain data sharing system, the method including:

receiving a data synchronization request transmitted by a lightweight node, and searching for an associated block corresponding to the lightweight node, the associated block being a block having an association with the lightweight node; the associated block including a plurality of transactions and a statistical proof transaction list; the plurality of transactions having their respective corresponding transaction visible addresses; and the statistical proof transaction list including a plurality of statistical proof transactions, and the statistical proof transactions being obtained by encrypting the transaction visible addresses corresponding to the transactions, and the quantities of the transaction visible addresses in the associated block;

extracting the statistical proof transaction list from the associated block, and recognizing a target index of the lightweight node in the statistical proof transaction list;

filtering out associated transactions associated with the lightweight node from the plurality of transactions included in the associated block, and determining an encrypted path set based on the filtered-out associated transactions, the encrypted path set including encrypted paths of the associated transactions and an encrypted path of the statistical proof transaction list; and transmitting the statistical proof transaction list, the target index, the associated transactions, and the encrypted path set to the lightweight node, to cause the lightweight node to determine validity of the associated transactions according to the statistical proof transaction list, the target index, and the encrypted path set, the validity being used for representing accuracy and completeness of the associated transactions.

An aspect of the embodiments of this application provides a data communication apparatus, including:

a receiving unit, configured to receive data from an associated block having an association with the lightweight node, the data including associated transactions that are associated with the lightweight node and that are in the associated block, and a statistical proof transaction list, the associated block including a plurality of transactions and the statistical proof transaction list, the plurality of transactions having their respective corresponding transaction visible addresses, the statistical proof transaction list including a plurality of statistical proof transactions, and the statistical proof transactions being obtained by encrypting the transaction visible addresses corresponding to the transactions, and the quantities of the transaction visible addresses in the associated block;

a recognizing unit, configured to recognize a target index of the lightweight node in the statistical proof transaction list;

an obtaining unit, configured to obtain an encrypted path set based on the associated transactions, the encrypted path set including encrypted paths of the associated transactions and an encrypted path of the statistical proof transaction list; and a determining unit, configured to determine validity of the associated transactions according to the statistical proof transaction list, the target index, and the encrypted path set, the validity being used for representing accuracy and completeness of the associated transactions.

An aspect of the embodiments of this application provides a data communication apparatus, including:

a receiving unit, configured to receive a data synchronization request transmitted by a lightweight node, and search for an associated block corresponding to the lightweight node, the associated block being a block having an association with the lightweight node; the associated block including a plurality of transactions and a statistical proof transaction list; the plurality of transactions having their respective corresponding transaction visible addresses; and the statistical proof transaction list including a plurality of statistical proof transactions, and the statistical proof transactions being obtained by encrypting the transaction visible addresses corresponding to the transactions, and the quantities of the transaction visible addresses in the associated block;

an extracting unit, configured to extract the statistical proof transaction list from the associated block, and recognize a target index of the lightweight node in the statistical proof transaction list;

the extracting unit being further configured to filter out associated transactions associated with the lightweight node from the plurality of transactions included in the associated block, and determine an encrypted path set based on the filtered-out associated transactions, the encrypted path set including encrypted paths of the associated transactions and an encrypted path of the statistical proof transaction list; and a transmitting unit, configured to transmit the statistical proof transaction list, the target index, the associated transactions, and the encrypted path set to the lightweight node, to cause the lightweight node to determine validity of the associated transactions according to the statistical proof transaction list, the target index, and the encrypted path set, the validity being used for representing accuracy and completeness of the associated transactions.

An aspect of the embodiments of this application provides a computer device acting as a lightweight node of a blockchain data network, including a memory and a processor, the memory storing a computer program that, when executed by the processor, causes the computer device to perform the method in the foregoing embodiments.

An aspect of the embodiments of this application provides a non-transitory computer storage medium, storing a computer program, the computer program including program instructions that, when executed by a processor of a computer device acting as a lightweight node of a blockchain data network, cause the computer device to perform the method in the foregoing embodiments.

An aspect of the embodiments of this application provides a computer program product or a computer program. The computer program product or the computer program includes computer instructions. The computer instructions are stored in a computer-readable storage medium. The computer instructions, when executed by a processor of a computer device, perform the method in the foregoing embodiments.

Through the data communication method of the embodiments of this application, the lightweight node may receive the statistical proof transaction list from the associated block, where the statistical proof transaction list includes the plurality of statistical proof transactions, and the statistical proof transactions are obtained by encrypting the transaction visible addresses corresponding to the transactions included in the associated block, and the quantities of the transaction visible addresses in the associated block; the lightweight node may recognize the target index of the lightweight node in the statistical proof transaction list, filter out the associated transactions associated with the lightweight node from the plurality of transactions included in the associated block, and determine the encrypted path set based on the filtered-out associated transactions, the encrypted path set including the encrypted paths of the associated transactions and the encrypted path of the statistical proof transaction list; and then the lightweight node may determine, according to the statistical proof transaction list, the target index, and the encrypted path set, the validity of the associated transactions related to the lightweight node, that is, determine the accuracy and the completeness of the associated transactions related to the lightweight node, where the accuracy of the associated transactions is used for representing whether the associated transactions are accurate, the completeness of the associated transactions is used for representing whether the associated transactions are complete, that the associated transactions are accurate means that content related to the associated transactions is not tampered with, and that the associated transactions are complete means that no content related to the associated transactions is missing. The lightweight node in this application obtains plaintext associated transactions that are related to the lightweight node and that are in the associated block, an encrypted path of the associated transactions, and an encrypted statistical proof transaction in the associated block and verifies, based on obtained information, validity of the associated transactions related to the lightweight node; and meanwhile the lightweight node does not obtain a plaintext transaction unrelated to the lightweight node, thereby verifying the validity of the associated transactions related to the lightweight node based on the premise of ensuring data isolation, that is, data communication security, ensuring validity of data transmitted during data communication, and improving data communication quality and efficiency.

DESCRIPTION OF EMBODIMENTS

Figure 1A:
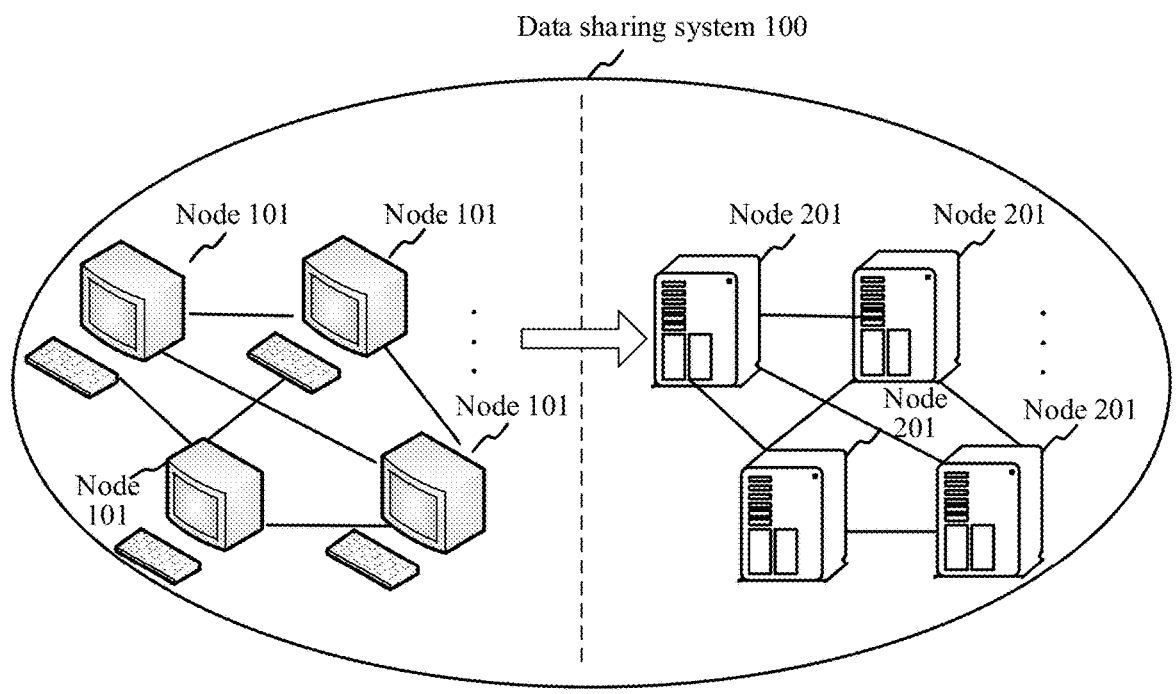
FIG. 1A is a schematic structural diagram of a blockchain data sharing system according to an embodiment of this application.

A blockchain and a cloud technology are involved in embodiments of this application. For ease of better understanding the embodiments of this application, related terms and technologies of the blockchain and the cloud technology are first described in detail below.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud storage is a new concept extended and developed on the cloud computing concept. A distributed cloud storage system (briefly referred to as a storage system below) refers to a storage system that collects, through functions such as a cluster application, a grid technology, and a distributed storage file system, a large quantity of various different storage devices (the storage devices are also referred to as storage nodes) in a network through application software or an application interface to work collaboratively to jointly provide data storage and service access functions to the outside world.

Because a large quantity of data calculation and data storage services are involved in the blockchain, and the large quantity of data calculation and data storage services need to occupy a large quantity of computer operating costs, each of a statistical proof transaction list, an associated transaction, and an encrypted path set in the blockchain involved in this application may be implemented through the cloud storage technology in the cloud technology. That is, the blockchain is stored on "cloud" through the cloud storage technology. When the statistical proof transaction list, the associated transaction, and the encrypted path set need to be stored in the blockchain, the data may be uploaded to the blockchain on "cloud" through the cloud storage technology; and when the data needs to be read, the data may be read from the blockchain on "cloud" at any time, thereby lowering a storage requirement on a terminal device and expanding an application range of the blockchain.

A blockchain is a new application mode of computer technologies such as distributed data storage, point-to-point transmission, a consensus mechanism, and an encryption algorithm. The blockchain is essentially a decentralized database and is a string of data blocks generated using a technology associated with a cryptographic method. Each data block includes information of a batch of network transactions, the information being used for verifying the validity of information of the data block (anti-counterfeiting) and generating a next data block. The blockchain may include a blockchain underlying platform, a platform product service layer, and an application service layer.

FIG. 1A is a schematic structural diagram of a blockchain data sharing system according to an embodiment of this application. The data sharing system 100 is a system used for implementing data sharing between nodes, the data sharing system 100 may include a plurality of nodes 101 and a plurality of nodes 201, the plurality of nodes 101 may be clients in the data sharing system 100, and the plurality of nodes 201 may be servers in the data sharing system 100. Usually, storage space and computing power of the node 201 are greater than those of the node 101. To ensure information interoperability in the data sharing system, there may be an information connection between nodes in the data sharing system, and information transmission may be performed between the nodes through the above information connection. For example, when any node 201 in the data sharing system 100 receives input information, all the nodes 201 in the data sharing system 100 obtain the input information according to a consensus algorithm, and store the input information as shared data, so that data stored on all the nodes 201 in the data sharing system 100 is consistent. However, because of the difference between the node 101 and the node 201 in storage space or a factor such as a service requirement, for any node 101 in the data sharing system 100, when receiving input information, the any node 101 stores only data related to the node.

Each node 201 in the blockchain data sharing system 100 provided in this embodiment of this application may store a complete blockchain, the complete blockchain includes transaction data related to each node 101 and each node 201, while each node 101 stores only transaction data related to the node 101, and each node 101 may request the transaction data related to the node 101 from any node 201.

Further, functions involved in the nodes in the blockchain data sharing system 100 shown in FIG. 1A further include: routing. Routing is a basic function of the node, and is used for supporting communication between nodes.

Specifically, each node 101 may communicate with each node 201, and a manner of performing communication between the node 101 and the node 201 may be implementing communication through a routing function of the node 101 or implementing communication through a routing function of the node 201.

The node 201 in the data sharing system 100 may be an independent physical server, or may be a server cluster including a plurality of physical servers or a distributed system, or may be a cloud server providing basic cloud computing services, such as a cloud service, a content delivery network (CDN), big data, and an artificial intelligence platform. The node 101 may be a smartphone, a tablet computer, a notebook computer, a desktop computer, a smart speaker, a smartwatch, an in-vehicle terminal, or the like, but is not limited thereto.

Figure 1B:
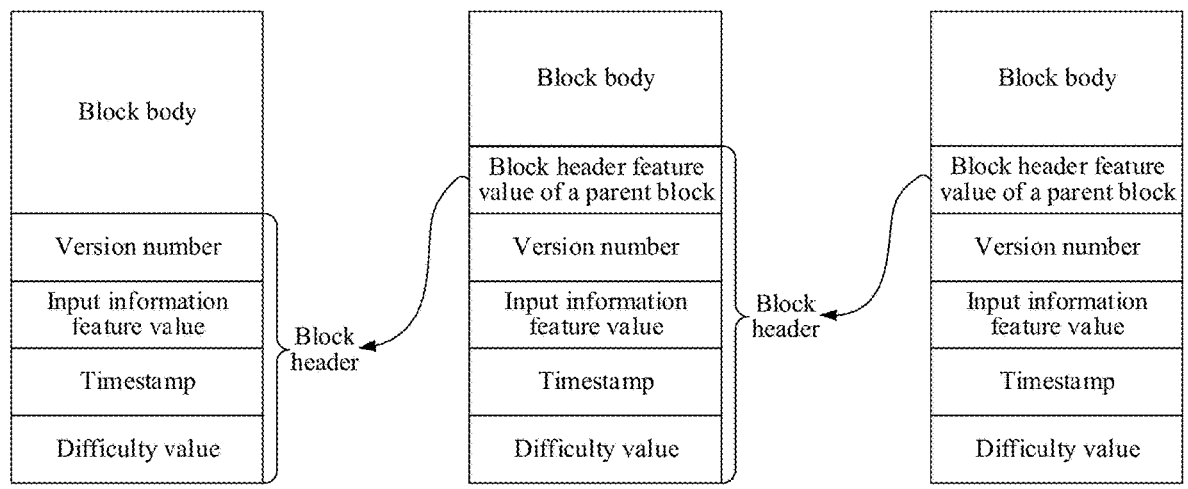
FIG. 1B is a schematic structural diagram of a blockchain according to an embodiment of this application.

One identical blockchain is stored in each node 201 in the data sharing system 100. The blockchain is formed by a plurality of blocks. FIG. 1B is a schematic structural diagram of a blockchain according to an embodiment of this application. The blockchain is formed by a plurality of blocks. Each block includes a block header and a block body, a block header of a genesis block stores an input information feature value, a version number, a timestamp, and a difficulty value, a block header of a block other than the genesis block stores an input information feature value, a version number, a timestamp, a block header feature value of a parent block, and a difficulty value, and a block body of each block stores input information In this application, in addition to transactions initiated by the nodes, the input information may further include a statistical proof transaction list generated based on these transactions, and the statistical proof transaction list may also be considered as a transaction.

Figure 1C:
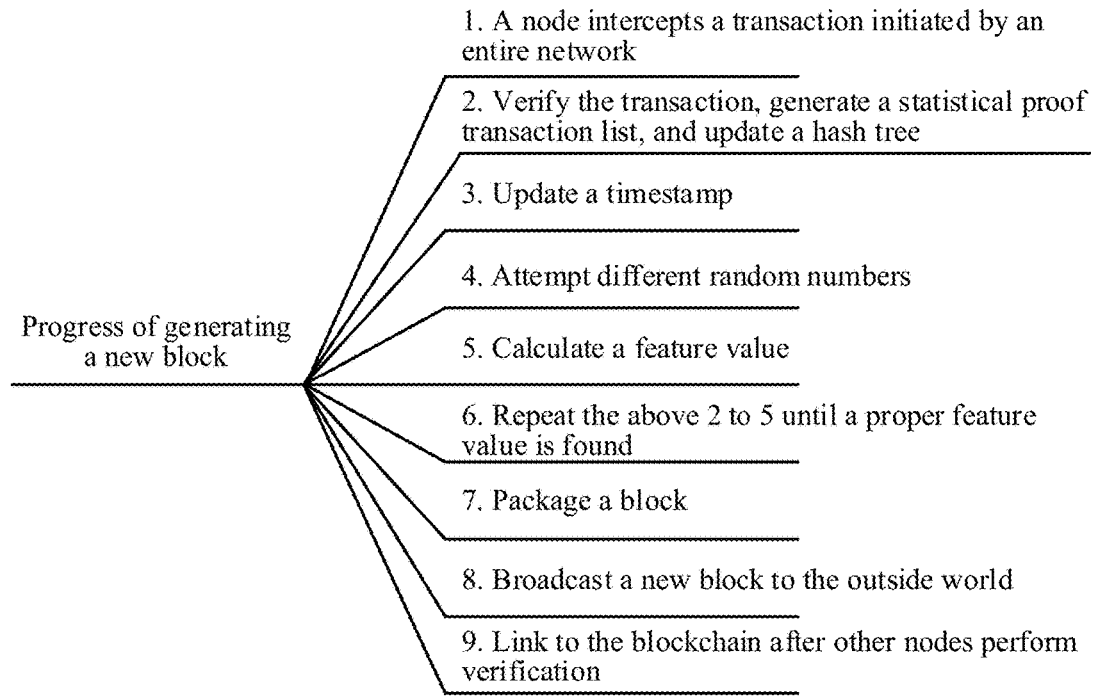
FIG. 1C is a schematic flowchart of generating a block according to an embodiment of this application.

When each block in the blockchain is generated, reference is made to FIG. 1C. FIG. 1C is a schematic flowchart of generating a new block according to an embodiment of this application. After receiving an initiated transaction, a node at which the blockchain is located checks the transaction, stores the transaction to a memory pool after completing the check, generates a statistical proof transaction list based on all transactions in the memory pool (all the transactions in the memory pool and the generated statistical proof transaction list may be collectively referred to as input information), and updates a hash tree used for recording the input information.

Then, when a random number less than a random number threshold is calculated, the information may be correspondingly stored to generate the block header and the block body to obtain the current block. Subsequently, a newly generated block is sent to the other nodes in the blockchain data sharing system in which the node is located, the newly generated block is verified by the other nodes, and after the verification is completed, the newly generated block is added to the blockchain stored in the nodes.

Figure 2:
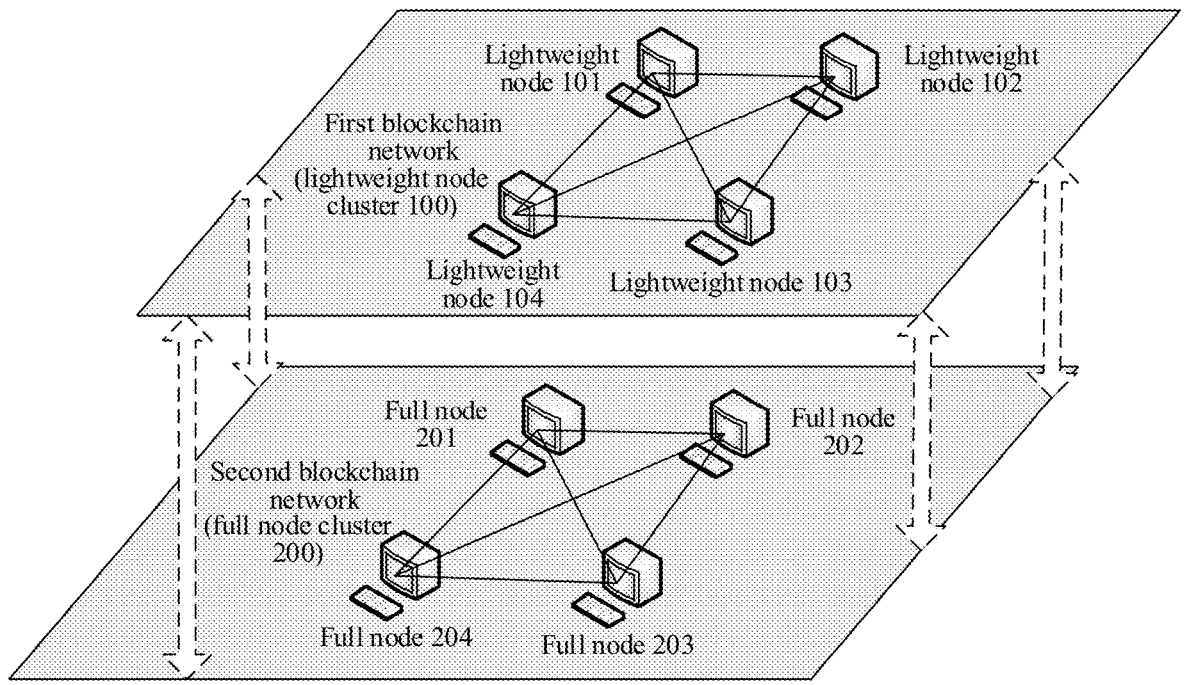
FIG. 2 is a schematic structural diagram of a data communication system according to an embodiment of this application.

FIG. 2 is a schematic diagram of an architecture of a data communication system according to an embodiment of this application. The architecture of the system includes: a lightweight node cluster 100 and a full node cluster 200, where the lightweight node cluster 100 includes a lightweight node 101, a lightweight node 102, a lightweight node 103, and a lightweight node 104, and the full node cluster 200 includes a full node 201, a full node 202, a full node 203, and a full node 204. The lightweight node cluster 100 is located in a first blockchain network, the full node cluster 200 is located in a second blockchain network, the first blockchain network is different from the second blockchain network, and the first blockchain network is an underlying network of the second blockchain network.

Specifically, a node in the first blockchain network only stores an associated transaction related to the node, but a node in the second blockchain network stores associated transactions of all nodes in the first blockchain network. For example, the first blockchain network is a public network, the second blockchain network is a private network, and the first blockchain network and the second blockchain network jointly form a blockchain network. Based on the above description, the blockchain network involved in this embodiment of this application is a double-layered blockchain network, may implement data isolation between nodes, and may be applied to a service scenario with relatively high confidentiality and privacy requirements such as a resource data issuer. For example, a merchant A and a merchant B may issue electronic invoices on the blockchain, that is, store the electronic invoices on the chain, but only an organization server maintaining the blockchain stores electronic invoices of all merchants. When the merchant A (or the merchant B) requests an on-chain electronic invoice from the organization server, the organization server only returns an invoice issued by the merchant A (or the merchant B) to the merchant A (or the merchant B), thereby implementing data isolation between merchants. That is, by locating nodes at different blockchain networks, different data is synchronized, thereby meeting a privacy secrecy requirement.

The quantity of lightweight nodes in the lightweight node cluster 100 in this embodiment of this application is only used as an example. In another feasible embodiment, the quantities of nodes in the lightweight node cluster 100 and the full node cluster 200 may be adjusted according to specific service scenarios. For example, the quantity of nodes in the lightweight node cluster 100 may alternatively be five or eight, and the quantity of nodes in the full node cluster 200 may alternatively be six or seven. This is not specifically limited in this application.

During specific implementation, a communicative connection is established between each two lightweight nodes in the lightweight node cluster 100. Specifically, the lightweight node 101, the lightweight node 102, the lightweight node 103, and the lightweight node 104 may communicate with each other through a wireless network or wired network. Similarly, a communicative connection is also established between each two full nodes in the full node cluster 200. Specifically, the full node 201, the full node 202, the full node 203, and the full node 204 may communicate with each other through a wireless network or wired network. In addition, any lightweight node in the lightweight node cluster 100 may communicate with any full node in the full node cluster 200 through network routing.

In a possible implementation, a lightweight node may transmit a data synchronization request to a full node that has highest quality of communicating with the lightweight node and that is in the full node cluster 200; or a lightweight node may transmit a data synchronization request to a full node that is closest to the lightweight node and that is in the full node cluster 200; or a lightweight node may transmit a data synchronization request to a full node that is selected from all full nodes in the full node cluster 200 through a consensus algorithm. The consensus algorithm includes but not limited to the proof of work (PoW) algorithm, the proof of stake (PoS) algorithm, the delegated proof of stake (DPoS) algorithm, the practical Byzantine fault tolerance (PBFT) algorithm, and the like.

In a possible implementation, a detailed description is made using an example in which the lightweight node 101 communicates with the full node 201. The lightweight node 101 transmits a data synchronization request to the full node 201, the full node 201 searches, in response to the data synchronization request transmitted by the lightweight node 101, for an associated block corresponding to the lightweight node 101; the associated block is a block having an association with the lightweight node 101 and being in the blockchain, and includes a plurality of transactions and a statistical proof transaction list; the plurality of transactions have their respective corresponding transaction visible addresses; and the statistical proof transaction list includes a plurality of statistical proof transactions, where any statistical proof transaction is obtained by encrypting any transaction visible address of the transaction included in the associated block, and the transaction visible quantity of the transaction visible address in the associated block. The full node 201 extracts the statistical proof transaction list from the associated block, and recognizes a target index of the lightweight node 101 in the statistical proof transaction list. The full node 201 filters out associated transactions associated with the lightweight node 101 from the associated block, and determines an encrypted path set based on the filtered-out associated transactions, the encrypted path set including encrypted paths of the associated transactions and an encrypted path of the statistical proof transaction list; and the full node 201 transmits the statistical proof transaction list, the target index, the associated transactions, and the encrypted path set to the lightweight node 101.

In a possible implementation, after receiving the statistical proof transaction list, the target index, the associated transactions, and the encrypted path set transmitted by the full node 201, the lightweight node 101 may determine accuracy of the associated transactions according to the encrypted path set, that is, check whether the associated transactions are accurate and whether the associated transactions are illegally tampered with; and may determine completeness of the associated transactions according to the target index and the statistical proof transaction list, that is, check whether the associated transactions are complete and whether content related to the associated transactions is missing.

Each of all the nodes in the blockchain network involved in this embodiment of this application may be a mobile phone, a tablet computer, a notebook computer, a palmtop computer, a mobile Internet device (MID), a vehicle, roadside equipment, an aircraft, and a wearable device, or may be an intelligent device with a data processing function such as a smartwatch, a smart band, or a pedometer. All the nodes may correspond to the same device type or different device types.

It may be understood that, the data communication system described in this embodiment of this application is to describe the technical solutions of the embodiments of this application more clearly, but does not constitute limitation to the technical solutions of the embodiments of this application. A person of ordinary skill in the art will appreciate that, as a system architecture evolves and a new business scenario emerges, the technical solutions provided in the embodiments of this application are also applicable to similar technical problems.

Figure 3A:
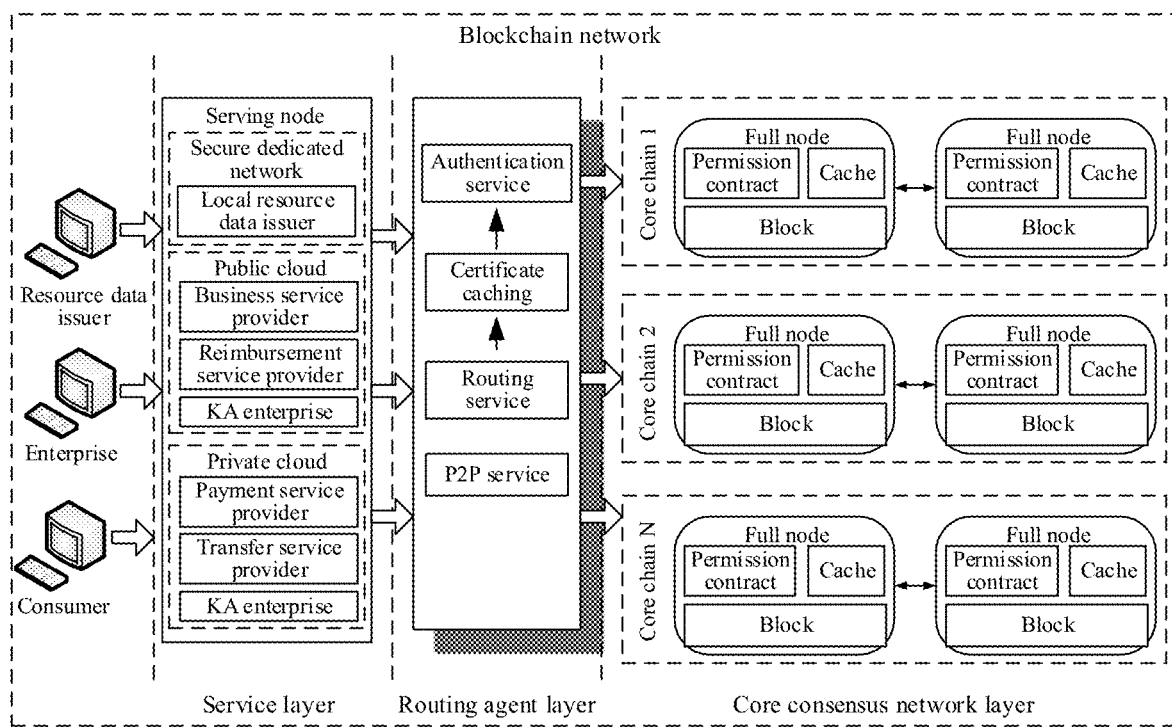
FIG. 3A is a schematic diagram of a scenario of a data communication method according to an embodiment of this application.

FIG. 3A is a schematic diagram of a scenario of a data communication method according to an embodiment of this application. The data communication method provided in this application may be applied to an electronic invoice service scenario. Specifically, a serving node involved in the embodiment in FIG. 3A may be a client facing a resource data issuer, an enterprise, a consumer, or the like. The serving node is specifically located at a service layer, and the serving node may belong to a secure dedicated network, a public cloud network, a private cloud network, or the like. The secure dedicated network includes a local organization, the public cloud network includes a business service provider, a reimbursement service provider, a key account (KA) enterprise, and the like, and the private cloud network includes a payment service provider, a transfer service provider, a KA enterprise, and the like. A proxy node may be located at a routing agent layer, and the proxy node may provide a P2P service, a routing service, a certificate caching service, and an authentication service. A core consensus network layer is jointly formed by one or more core blockchains, for example, a core chain 1 and a core chain 2, each core chain is jointly maintained by full nodes in the blockchain through communicative connection, and different core chains may include different services. For example, the core chain 1 represents a service 1, the core chain 2 represents a service 2, and a core chain N represents a service N. Each core chain may include several full nodes, and the full nodes may generate and fulfill a smart contract or a permission contract, cache and store data in the blockchain, and release a block to a blockchain network.

The proxy node may play a role isolation between the service layer and the core consensus network layer, and the service layer, the routing agent layer, and the core consensus network layer jointly form a blockchain network, where the blockchain network may be applied to a service scenario with high confidentiality such as a resource data issuer.

In a possible implementation, the serving node in the service layer may submit a data synchronization request to the core consensus network layer through the routing agent layer. Using an example in which the serving node is a business service provider, the business service provider may transmit the data synchronization request (note synchronization request) to a full node that has highest quality of communicating with the business service provider and that is at the core consensus network layer, or the business service provider may transmit the data synchronization request (note synchronization request) to a full node that is closest to the business service provider and that is at the core consensus network layer, or the business service provider may transmit the data synchronization request (note synchronization request) to a target full node. The target full node may be a full node selected from all full nodes on a core chain corresponding to a note service at the core consensus network layer through a consensus algorithm. A target full node selected from each core chain through the consensus algorithm may be periodically updated, to achieve confidentiality and fairness of block data in the blockchain. The note synchronization request includes identity information of the business service provider. After receiving the note synchronization request transmitted by the serving node, a full node at the core consensus network layer may obtain the identity information of the business service provider in the note synchronization request, and then check the identity information of the business service provider. The identity information of the business service provider may be an authoritative digital certificate obtained by the business service provider from a certificate authority (CA) organization, and the full node may check the authoritative digital certificate of the business service provider, and may obtain, when the authoritative digital certificate of the business service provider is checked successfully, an associated block corresponding to the business service provider.

Figure 3B:
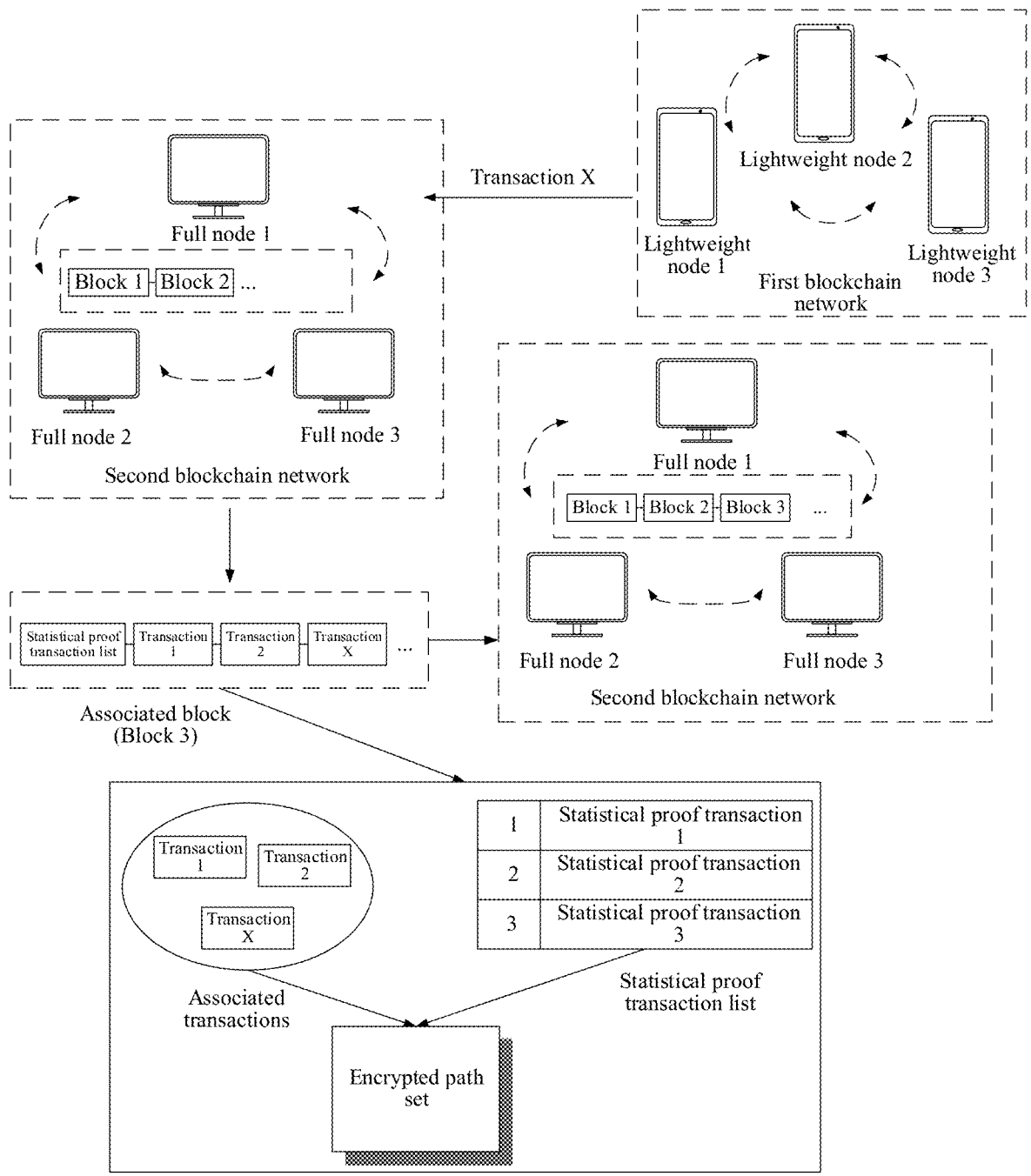
FIG. 3B is a schematic diagram of a scenario of another data communication method according to an embodiment of this application.

In a possible implementation, FIG. 3B is a schematic diagram of a scenario of another data communication method according to an embodiment of this application. A lightweight node 1, a lightweight node 2, and a lightweight node 3 are located in a first blockchain network, and a full node 1, a full node 2, and a full node 3 are located in a second blockchain network. The lightweight node 1 initiates a transaction X to the full node 1 (specific content of the transaction X may be that a user 1 of the lightweight node 1 transfers an electronic note out), the transaction X includes a plurality of transactions visible addresses (the plurality of transactions visible addresses may be designated by the user 1 of the lightweight node 1. For example, the user 1 may designate that the transaction visible addresses include a node address of the lightweight node 2. A node address of the lightweight node 1 is usually a transaction visible address of the transaction X by default), and the full node 1 broadcasts the transaction X to the second blockchain network, so that all full nodes in the second blockchain network store the transaction X in their respective transaction pools (it is assumed that before the transaction X is stored, a transaction 1 and a transaction 2 have been stored in the transaction pools, and transaction visible addresses of both the transaction 1 and the transaction 2 include the node address of the lightweight node 2). The full nodes may perform a blockchain consensus on each transaction in the transaction pools. After the consensus succeeds, the full node 1 respectively collects statistics on the transaction visible quantities of transaction visible addresses corresponding to each transaction in the transaction pool, that is, transaction visible addresses respectively corresponding to the transaction 1, the transaction 2, and the transaction X; and then the full node 1 encrypts all the transaction visible addresses and the transaction visible quantities of all the transaction visible addresses respectively, and obtains a statistical proof transaction list. Because the statistical proof transaction list is also a transaction, the full node 1 may generate an associated block according to the statistical proof transaction list, the transaction 1, the transaction 2, and the transaction X. For example, a block 3 shown in FIG. 3B is the associated block generated by the full node 1 according to the statistical proof transaction list, the transaction 1, the transaction 2, and the transaction X.

Then, if the full node 1 receives a data synchronization request transmitted by the lightweight node 2, the full node 1 may extract the statistical proof transaction list from the associated block, and recognize a target index of the lightweight node 2 in the statistical proof transaction list. Because transaction visible addresses existing in the foregoing block 3 include the node address of the lightweight node 2, the full node 1 may use the block 3 as an associated block of the lightweight node 2. Then, the full node 1 may determine a Merkle path of the statistical proof transaction list, a Merkle path of the transaction 1, a Merkle path of the transaction 2, and a Merkle path of the transaction X in the block 3. Specifically, the Merkle path of the statistical proof transaction list, the Merkle path of the transaction 1, the Merkle path of the transaction 2, and the Merkle path of the transaction X may be collectively referred to as an encrypted path set. Finally, the full node 1 transmits the statistical proof transaction list, the target index, the associated transactions (that is, the transaction 1, the transaction 2, and the transaction X), and the encrypted path set to the lightweight node 2. Because transaction visible addresses of each of the transaction 1, the transaction 2, and the transaction X in the block 3 include the node address of the lightweight node 2, each of the transaction 1, the transaction 2, and the transaction X is an associated transaction of the lightweight node 2.

Figure 3C:
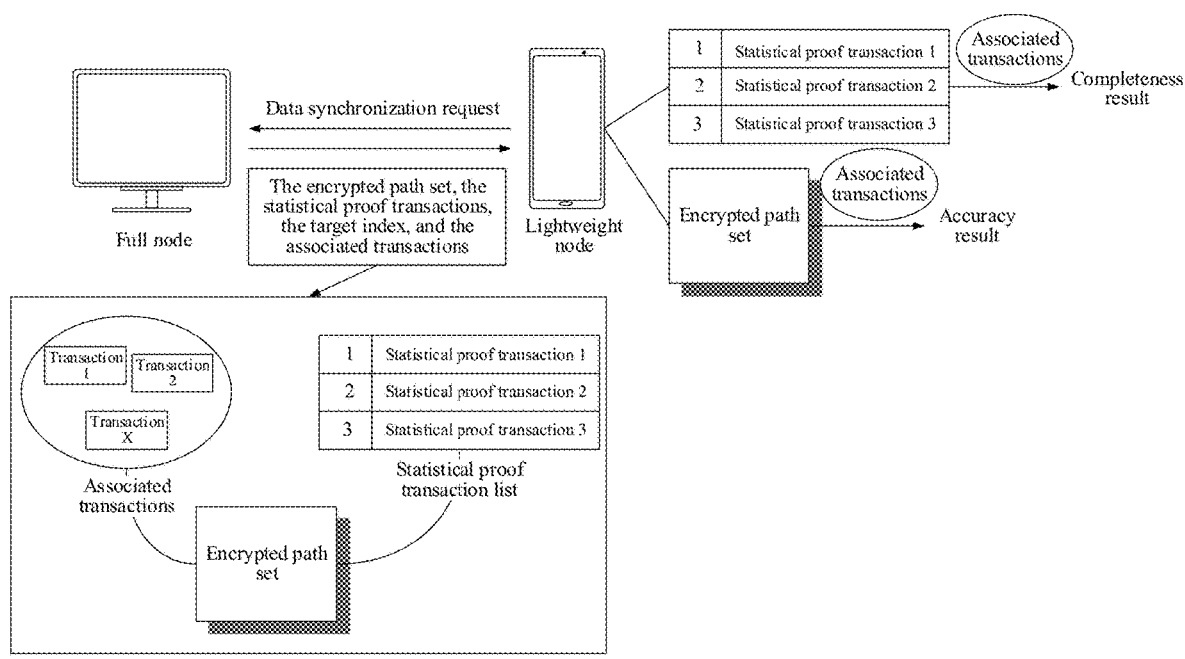
FIG. 3C is a schematic diagram of a scenario of another data communication method according to an embodiment of this application.

In a possible implementation, FIG. 3C is a schematic diagram of a scenario of another data communication method according to an embodiment of this application. After receiving a statistical proof transaction list, a target index, a transaction 1, a transaction 2, a transaction X, and an encrypted path set transmitted by a full node, a lightweight node may determine a validity result of the transaction 1, the transaction 2, and the transaction X according to the statistical proof transaction list, the target index, and the encrypted path set. The validity result may include an accuracy result and a completeness result. Specifically, a lightweight node 2 may determine an accuracy result of the transaction 1, the transaction 2, and the transaction X according to the encrypted path set, that is, check whether content of the transaction 1, the transaction 2, and the transaction X is tampered with; and determine a completeness result of the transaction 1, the transaction 2, and the transaction X according to the target index, the statistical proof transaction list, and an encrypted path of the statistical proof transaction list, that is, check whether the content of the transaction 1, the transaction 2, and the transaction X is missing.

The data communication method provided in this embodiment of this application may be applied to a service scenario such as a resource data issuer or a corporation, isolation between data may be implemented based on the double-layered blockchain network provided in this embodiment of this application, and after a lightweight node requests an associated transaction related to the lightweight node from a serving node, validity of the associated transaction obtained by the lightweight node may be proved through a statistical proof transaction list, thereby not only ensuring security of data stored in the blockchain network, but also meeting an application requirement that the lightweight node needs to check the validity of the associated transaction.

Figure 4:
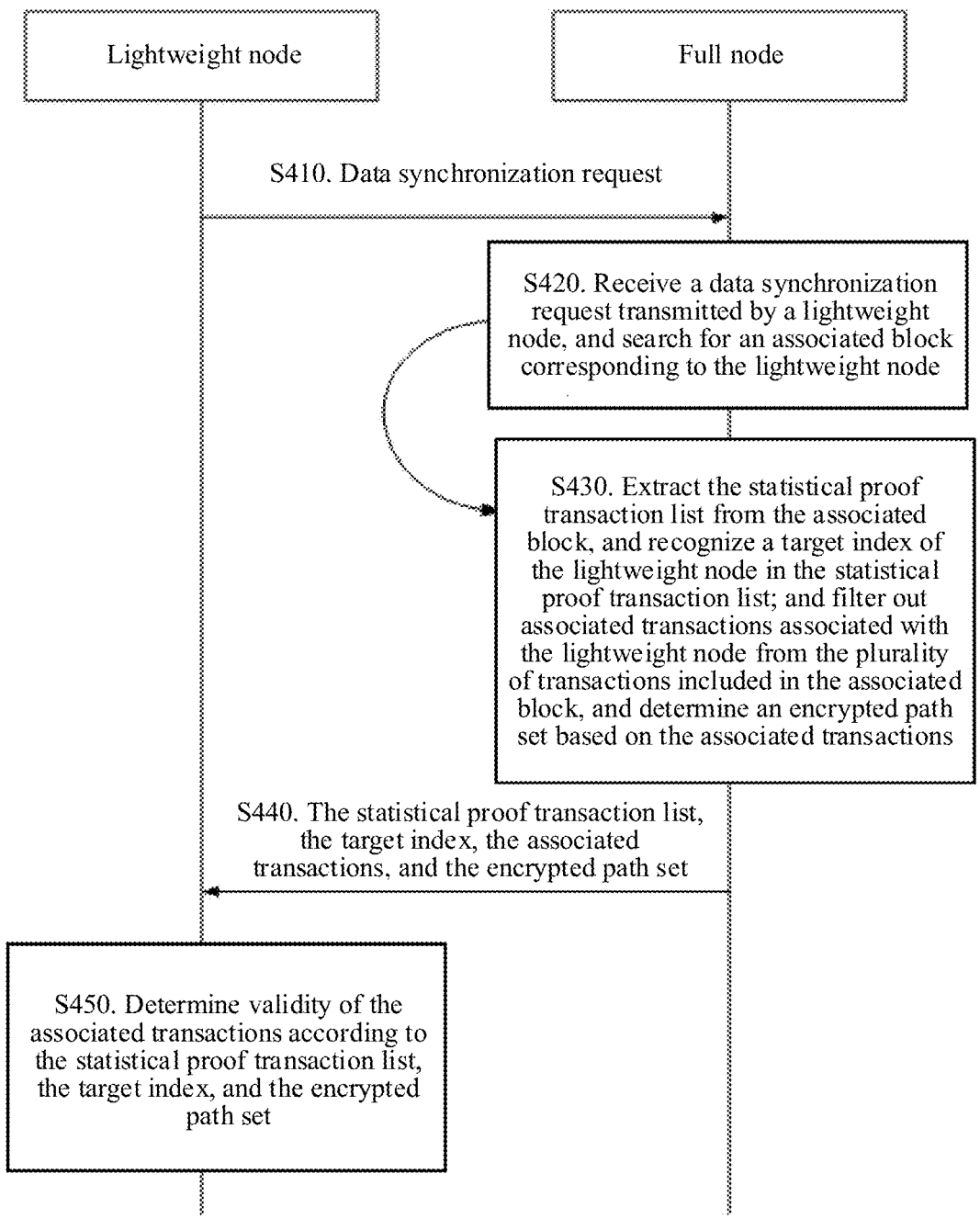
FIG. 4 is a schematic flowchart of a data communication method according to an embodiment of this application.

FIG. 4 is a schematic flowchart of a data communication method according to an embodiment of this application. The method is applied to a blockchain network, the blockchain network includes a first blockchain network and a second blockchain network, the first blockchain network includes a lightweight node, and the second blockchain network includes a full node. Operation steps of the method may be performed by a computer device, and the computer device may be the lightweight node, or may be the full node. This embodiment mainly describes an interaction process between the lightweight node and the full node, and the method includes but not limited to the following steps S410 to S450:

Step S410: The lightweight node transmits a data synchronization request to the full node.

During specific implementation, the lightweight node may be a simplified payment verification (SPV) node, and the full node may be a consensus node. The full node may store a complete blockchain, where the blockchain includes associated transactions of all nodes in the first blockchain network. The lightweight node may transmit the data synchronization request to the full node, where the data synchronization request is used for requesting associated transactions related to the lightweight node from the full node.

In a possible implementation, the lightweight node may package a period of time, a node address of the lightweight node, identity information of the lightweight node, a digital signature of the lightweight node, and a service type of data that the lightweight node needs to synchronize and encapsulate them into a data synchronization request, and then transmit the data synchronization request to the full node.

In the blockchain network, the lightweight node is characterized by including but not limited to: being not always online; being unnecessary to store an entire blockchain, but being only necessary to store a block header of each block; and being unnecessary to store all transactions on the chain, but being only necessary to store a transaction related to the lightweight node. The full node is characterized by including but not limited to: being always online; maintaining complete blockchain information on a local hard disk; intercepting transaction information on the blockchain network, and verifying validity of each transaction; determining transactions which may be packaged into a block; and intercepting a block dug out by another miner, verification validity of the block, and mining.

For example, in an electronic invoice service scenario, the lightweight node may be a client of a consumer, the consumer may include a personal consumer or an enterprise consumer, the full node may be a client of a note service provider, and electronic invoices of consumption of all consumers are stored in the client of the note service provider. The client of the note service provider is located in the second blockchain network, the second blockchain network may include one or more blockchains, and when the second blockchain network includes a plurality of blockchains, all the blockchains may be differentiated according to different services or places. For example, the second blockchain network includes a blockchain 1, a blockchain 2, and a blockchain 3. The blockchain 1 may be responsible for an electronic invoice service 1 corresponding to a service 1, the blockchain 2 may be responsible for an electronic invoice service 2 corresponding to a service 2, and the blockchain 3 may be responsible for an electronic invoice service 3 corresponding to a service 3. In this case, if an enterprise transmits a data synchronization request to the note service provider, where the data synchronization request includes a service type, the note service provider may determine, according to the service type, a blockchain which is maintained by a client of a business service provider corresponding to the enterprise.

In a possible implementation, the lightweight node in the first blockchain network may transmit the data synchronization request to a full node that has highest quality of communicating with the lightweight node and that is in the second blockchain network, or the lightweight node in the first blockchain network may transmit the data synchronization request to a full node that is closest to the lightweight node and that is in the second blockchain network, or the lightweight node in the first blockchain network may transmit the data synchronization request to any full node in the second blockchain network, or the lightweight node in the first blockchain network transmits the data synchronization request to a target full node in the second blockchain network. The target full node is a node selected from all full nodes in the second blockchain network through a consensus algorithm.

Step S420: The full node receives a data synchronization request transmitted by a lightweight node, and searches for an associated block corresponding to the lightweight node.

The associated block is a block having an association with the lightweight node and being in the blockchain; and the block having the association may be a real-time block that has an association with the lightweight node and that is in the blockchain network, or may be a historical block that has an association with the lightweight node and that is in the blockchain network. The associated block including a plurality of transactions and a statistical proof transaction list; the plurality of transactions have their respective corresponding transaction visible addresses.

In a possible implementation, if the data synchronization request includes identity information of the lightweight node, the full node may obtain the identity information of the lightweight node from the data synchronization request, and then the full node may check the obtained identity information of the lightweight node. During specific implementation, the identity information may include a digital signature of the lightweight node, and the digital signature is obtained after the lightweight node signs the data synchronization request according to a private key of the lightweight node; and after receiving the identity information from the lightweight node, the full node may check the digital signature of the lightweight node according to a public key of the lightweight node, and when the digital signature is checked successfully, it indicates that identity check on the lightweight node is successful. Through this manner, validity of the identity of the lightweight node is checked, to help improve security of data between the lightweight node and the full node, thereby ensuring that the data is transmitted to the valid lightweight node.

Additionally, the identity information may further include a digital certificate of the lightweight node, the digital certificate may be a public key infrastructure (PKI), and in the PKI, the digital certificate is an identity proof of a public key owner, and may be issued by an authoritative organization, for example, a CA organization. The full node may check the digital certificate of the lightweight node. Specifically, the full node may obtain a keyword in the digital certificate through a keyword extraction algorithm, and recognize a target image in the digital certificate through an image recognition algorithm; and the full node checks the digital certificate of the lightweight node according to the obtained keyword and target image, and when the digital certificate of the lightweight node is checked successfully, it indicates that identity check on the lightweight node is successful.

In a possible implementation, the full node may obtain the node address of the lightweight node, and then obtain an associated block corresponding to the lightweight node in the blockchain according to the node address of the lightweight node. When transaction visible addresses of at least one transaction of transactions included in a block on the blockchain include the node address of the lightweight node, the block is an associated block having an association with the lightweight node.

A process of generating the node address may include: generating the node address based on a key pair. Specifically, each key pair includes a private key and a public key. A private key is a digit, and is usually randomly selected through a randomized algorithm. Based on a private key, a public key may be generated using such a unidirectional encryption function as elliptic curve multiplication. Based on a public key, a bitcoin address, that is, node address may be generated using a unidirectional cryptographic hash function, where each node in the blockchain network corresponds to a unique node address.

Step S430: The full node extracts the statistical proof transaction list from the associated block, and recognizes a target index of the lightweight node in the statistical proof transaction list; and filters out associated transactions associated with the lightweight node from the plurality of transactions included in the associated block, and determines an encrypted path set based on the filtered-out associated transactions.

During specific implementation, the statistical proof transaction list includes a plurality of statistical proof transactions, where each statistical proof transaction is obtained by encrypting a transaction visible address corresponding to the transaction included in the associated block, and the quantity of the transaction visible address in the associated block. Specifically, the encryption may be performed using an encryption algorithm, and the encryption algorithm includes but not limited to: Message-Digest Algorithm 5 (MD5), Secure Hash Algorithm 256 (SHA256), Secure Hash Algorithm 512 (SHA512), Secure Hash Algorithm 384 (SHA384), Secure Hash Algorithm 1 (SHA-1), Hash-based Message Authentication Code (HMAC) algorithm, AES algorithm, DES algorithm, 3DES algorithm, RSA algorithm, ECC algorithm, and the like.

During specific implementation, there may be one or more associated transactions associated with the lightweight node. In addition, the one or more associated transactions may include a transaction initiated by the lightweight node, the one or more associated transactions may also include a transaction received by the lightweight node, and the one or more associated transactions may further include a transaction witnessed by the lightweight node. When transaction visible addresses of a transaction in the associated block include the node address of the lightweight node, the transaction is a transaction associated with the lightweight node (the transaction visible addresses may be manually designated by a transaction initiating party). When a transaction in the associated block is initiated by the lightweight node, a node address of the lightweight node is inevitably a transaction visible address of the transaction.

Additionally, the encrypted path set including encrypted paths of the associated transactions and an encrypted path of the statistical proof transaction list. Specifically, the encrypted path may be a Merkle path. A plurality of statistical proof transactions included in the statistical proof transaction list are sequentially arranged. Specifically, the plurality of statistical proof transactions are arranged according to a sequence in which the transaction visible addresses occur in the transactions included in the associated block. Moreover, a target index of the lightweight node in the statistical proof transaction list may be 1, 2, 3, . . . , and through the target index, a target statistical proof transaction corresponding to the lightweight node in the statistical proof transaction list may be obtained.

A transaction visible address of any transaction may be set by a transaction initiator manually, and there may be one or more transaction visible addresses. The quantity of transaction visible addresses refers to the quantity of a plurality of transactions associated with the transaction visible addresses in the associated block.

For example, assuming that a node address of a lightweight node A is A and the lightweight node A initiates a transaction X, the lightweight node A may be designated as a transaction visible address of the transaction X; and assuming that node addresses of the lightweight node A are B and C, the lightweight node A designates that the transaction X is visible to the lightweight node B and the lightweight node C. Therefore, the transaction X is an associated transaction of each of the lightweight node A, the lightweight node B, and the lightweight node C. For the transaction X, transaction visible addresses of the transaction X include A, B, and C.

Step S440: The full node transmits the statistical proof transaction list, the target index, the associated transactions, and the encrypted path set to the lightweight node.

In a possible implementation, the full node transmits, when the identity information of the lightweight node check is checked by the full node successfully, the statistical proof transaction list, the target index, the associated transactions, and the encrypted path set to the lightweight node. Additionally, the full node may further transmit a block header of the associated block to the lightweight node, where the block header of the associated block includes but not limited to: a version number of the associated block, an input information feature value, a timestamp, a difficulty value, a block Merkle root and the like.

Step S450: The lightweight node determines validity of the associated transactions according to the statistical proof transaction list, the target index, and the encrypted path set, the validity being used for representing accuracy and completeness of the associated transactions.

During specific implementation, the validity of the associated transactions may include accuracy of the associated transactions and completeness of the associated transactions. Specifically, the lightweight node may check whether the associated transactions are accurate according to the encrypted path set, that is, check whether the associated transactions are tampered with, thereby obtaining the accuracy; and the lightweight node may check, according to the target index, the statistical proof transaction list, and the encrypted path of the statistical proof transaction list, whether the associated transactions are complete, that is, check whether content of the associated transactions is missing, thereby obtaining the completeness.

In a possible implementation, before determining validity of the associated transactions according to the statistical proof transaction list, the target index, the associated transactions, and the encrypted path set, the lightweight node may obtain identity information of the full node, where the identity information may specifically include a digital signature of the lightweight node, and the digital signature is obtained after the full node signs the statistical proof transaction list, the target index, the associated transactions, and the encrypted path set according to a private key of the full node. After obtaining the identity information of the full node, the lightweight node may check the digital signature of the full node according to a public key of the full node, and when the digital signature is checked successfully, it indicates that the identity information of the full node is checked successfully. Through this manner, security of data between the lightweight node and the full node can be improved.

The data communication method provided in this embodiment of this application may be applied to the double-layered blockchain network including the first blockchain network and the second blockchain network, the lightweight node is located in the first blockchain network, the full node is located in the second blockchain network, and data may be exchanged between the lightweight node and the full node. Specifically, the lightweight node may transmit the data synchronization request to the full node, and after receiving the data synchronization request of the lightweight node, the full node may transmit an associated transaction associated with the lightweight node to the lightweight node. In this solution, in the statistical proof transaction list, the quantities of all the transaction visible addresses are placed into a block, but a related transaction plaintext is not placed into the block, and when obtaining the statistical proof transaction list, any one node in the blockchain network cannot calculate a statistical proof transaction corresponding to each node address because of being lack of all transaction information. The encrypted path set ensures that a single transaction is correct and not tampered with, and the statistical proof transaction list ensures that the total quantity of the obtained associated transactions is consistent with that on the chain and not tampered with. By superposing the two proofs, it may be completely believed that the obtained data is data that may be obtained by the node in the block, and all required information is complete. In this way, without not leaking the quantities of other transaction visible addresses, each lightweight node may verify correctness and completeness of its own synchronization data, thereby ensuring security isolation of sensitive service data and a validity proof after the security isolation, implementing isolation of the data between the lightweight node and the full node, and improving security of the data.

Figure 5:
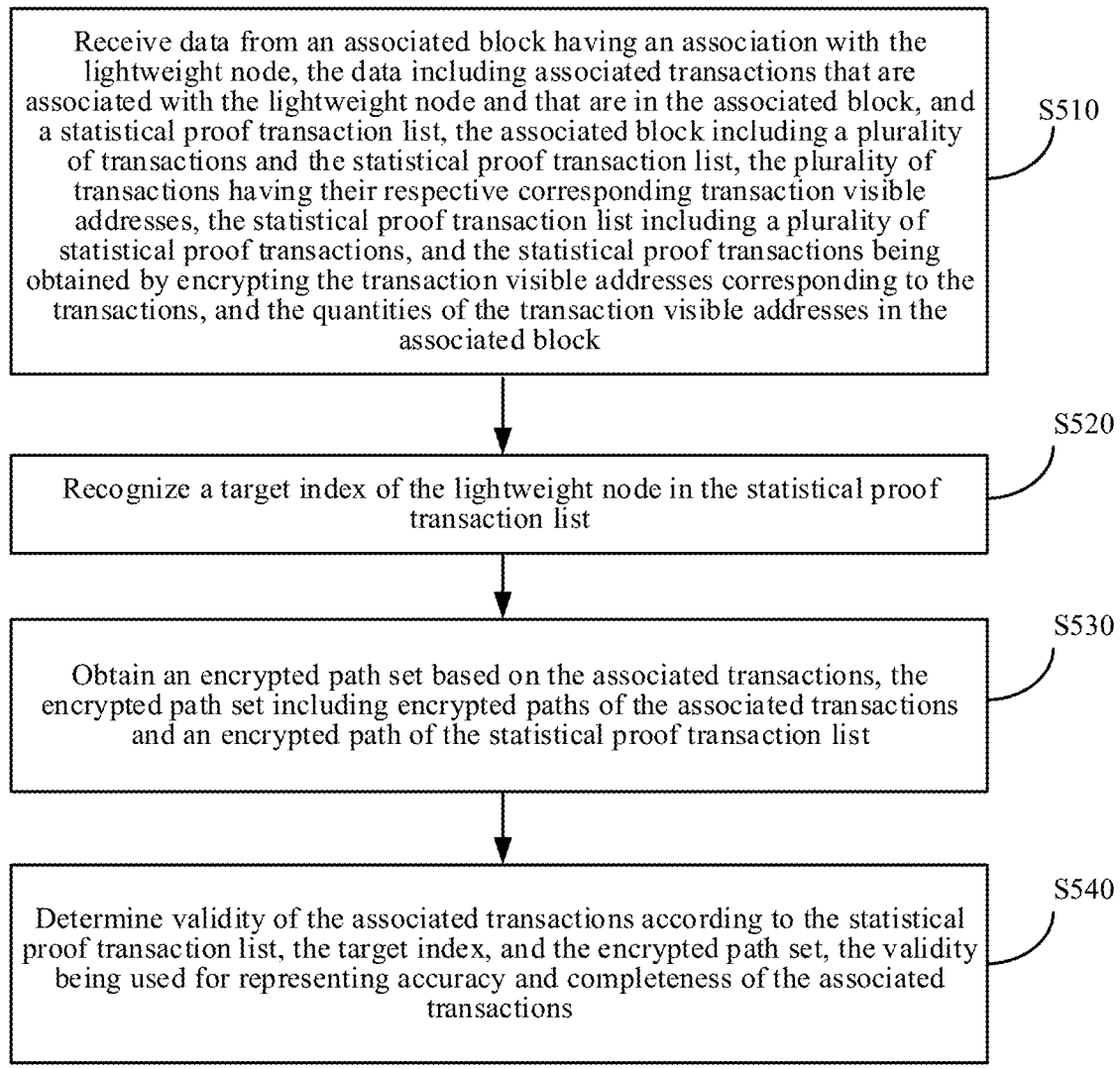
FIG. 5 is a schematic flowchart of another data communication method according to an embodiment of this application.

FIG. 5 is a schematic flowchart of another data communication method according to an embodiment of this application. The method is applied to a blockchain network, the blockchain network includes a first blockchain network and a second blockchain network, the first blockchain network includes a lightweight node, and the second blockchain network includes a full node. Operation steps of the method may be performed by a computer device, and the computer device may be the lightweight node. This embodiment mainly describes a process that the lightweight node verifies an associated transaction, and the method includes but not limited to the following steps S510 to S540.

Step S510: Receive data from an associated block having an association with the lightweight node, the data including associated transactions that are associated with the lightweight node and that are in the associated block, and a statistical proof transaction list, the associated block including a plurality of transactions and the statistical proof transaction list, the plurality of transactions having their respective corresponding transaction visible addresses, the statistical proof transaction list including a plurality of statistical proof transactions, and the statistical proof transactions being obtained by encrypting the transaction visible addresses corresponding to the transactions, and the quantities of the transaction visible addresses in the associated block.

Step S520: Recognize a target index of the lightweight node in the statistical proof transaction list.

During specific implementation, the lightweight node receives the statistical proof transaction list extracted from the associated block by the full node and transmitted by the full node; and receives a target index of the lightweight node recognized by the full node in the statistical proof transaction list and transmitted by the full node, or the lightweight node may recognize its own target index from the received statistical proof transaction list.

The statistical proof transaction list includes a plurality of statistical proof transactions, the plurality of statistical proof transactions are arranged in occurrence order of transaction visible addresses, and a specific arrangement manner may be ascending order, descending order, or the like. For example, the statistical proof transaction list may include a statistical proof transaction 1, a statistical proof transaction 2, and a statistical proof transaction 3, where the statistical proof transaction 1 is obtained by encrypting a transaction visible address 1 of the transaction included in the associated block, and the quantity m1 of the transaction visible address 1 in the associated block. Similarly, the statistical proof transaction 2 is obtained by encrypting a transaction visible address 2 of the transaction included in the associated block, and the quantity m2 of the transaction visible address 2 in the associated block, and the statistical proof transaction 3 is obtained by encrypting a transaction visible address 3 of the transaction included in the associated block, and the quantity m3 of the transaction visible address 3 in the associated block. When an occurrence sequence of the transaction visible address 1, the transaction visible address 2, and the transaction visible address 3 in the transactions is sequentially the transaction visible address 1, the transaction visible address 2, and the transaction visible address 3, an arrangement sequence of the statistical proof transactions in the statistical proof transaction list may be: the statistical proof transaction 1, statistical proof the transaction 2, and the statistical proof transaction 3.

Moreover, the lightweight node may further receive an associated transaction associated with the lightweight node and extracted by the full node from the associated block. The transaction quantity of associated transactions may be one or more.

Step S530: Obtain an encrypted path set based on the associated transactions, the encrypted path set including encrypted paths of the associated transactions and an encrypted path of the statistical proof transaction list.

During specific implementation, the lightweight node receives the encrypted path set transmitted by the full node. The encrypted path set includes an encrypted path of an associated transaction, the transaction quantity of associated transactions may be one or more, and because the statistical proof transaction list is also a transaction, the encrypted path set further includes an encrypted path of the statistical proof transaction list. For example, when the quantity of associated transactions is n and the associated transactions are respectively x1, x2, x3, . . . , and xn, the encrypted path set includes an encrypted path of x1, an encrypted path of x2, an encrypted path of x3, . . . , an encrypted path of xn, and an encrypted path of the statistical proof transaction list.

Figures 6A, 6B:
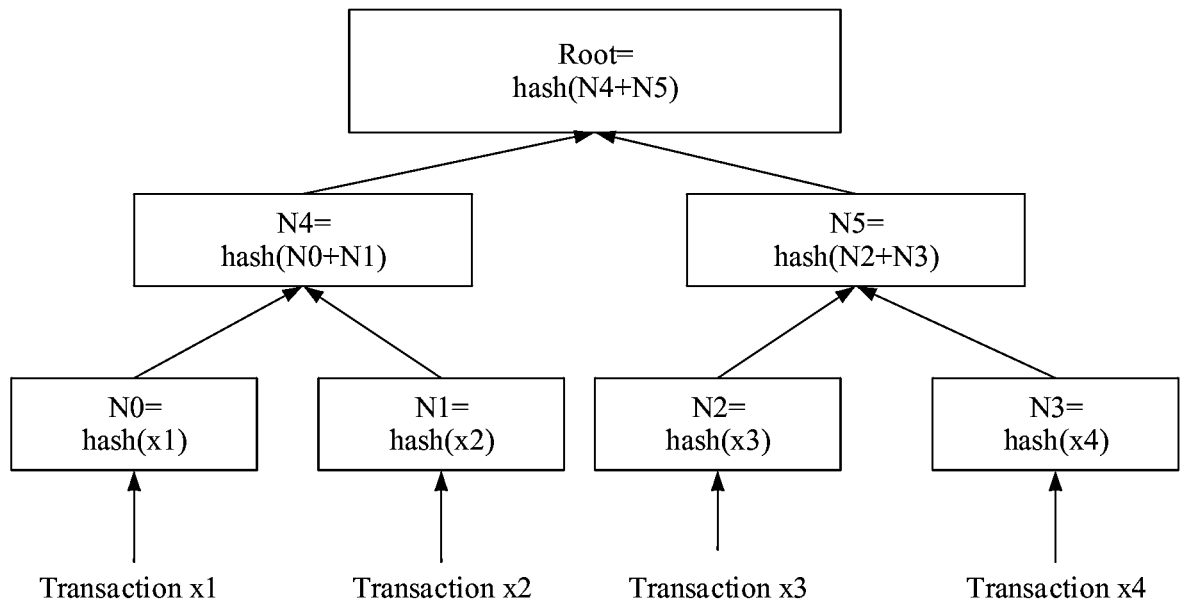
FIG. 6A is a schematic flowchart of obtaining an encrypted path according to an embodiment of this application.
FIG. 6B is a schematic diagram of a statistical proof transaction list according to an embodiment of this application.

In a possible implementation, FIG. 6A is a schematic flowchart of obtaining an encrypted path according to an embodiment of this application. An encrypted path may be specifically a Merkle path obtained through a Merkle tree. For a transaction x1, an encrypted path corresponding to the transaction x1 is: N1 and N5, an encrypted path corresponding to a transaction x2 is: NO and N5, an encrypted path corresponding to a transaction x3 is: N3 and N4, an encrypted path corresponding to a transaction x4 is: N2 and N4. An associated transaction and a statistical proof transaction list may be any one of the transaction x1, the transaction x2, the transaction x3, and the transaction x4.

Step S540: Determine validity of the associated transactions according to the statistical proof transaction list, the target index, and the encrypted path set, the validity being used for representing accuracy and completeness of the associated transactions.

During specific implementation, the validity may include the accuracy and the completeness. The lightweight node may check, based on the encrypted path set, whether the associated transactions are accurate, and obtain the accuracy of the associated transactions; and may check, based on the target index, the statistical proof transaction list, and the encrypted path of the statistical proof transaction list, whether the associated transactions are complete, and obtain the completeness of the associated transactions.

In a possible implementation, there are a plurality of associated transactions, the plurality of associated transactions include a first associated transaction and a second associated transaction, and the encrypted paths of the plurality of associated transactions includes a first encrypted path corresponding to the first associated transaction and a second encrypted path corresponding to the second associated transaction. The lightweight node determines a first Merkle root according to the first associated transaction and the first encrypted path, and the lightweight node determines a second Merkle root according to the second associated transaction and the second encrypted path. Then, the lightweight node receives a block Merkle root of the associated block. The lightweight node determines, when the first Merkle root, the second Merkle root, and the block Merkle root are all the same as each other, that the associated transactions are accurate. The lightweight node determines, when at least two Merkle roots of the first Merkle root, the second Merkle root, and the block Merkle root are not the same as each other, that the associated transactions are inaccurate.

For example, as shown in FIG. 6A, assuming that the associated transactions include the transaction x1, the transaction x2, the transaction x3, and the transaction x4, the encrypted path corresponding to the transaction x1 is: N1 and N5, an encrypted path corresponding to a transaction x2 is: N0 and N5, an encrypted path corresponding to a transaction x3 is: N3 and N4, an encrypted path corresponding to a transaction x4 is: N2 and N4. Then, the lightweight node may determine the first Merkle root according to the transaction x1, and N1 and N5, which is specifically as follows: The lightweight node performs a hash operation on the transaction x1 through a hash algorithm, to obtain hash (x1), then the lightweight node performs a hash operation on hash (x1) and N1, to obtain hash[hash (x1)+N1], and finally the lightweight node performs a hash operation on hash[hash (x1)+N1] and N5, to obtain hash{hash[hash (x1)+N1]+N5}, that is, a Merkle root root1. Similarly, the lightweight node may obtain a Merkle root root2=hash{hash[hash (x2)+N0]+N5} corresponding to the transaction x2, the lightweight node may obtain a Merkle root root3=hash{hash[hash (x3)+N3]+N4} corresponding to the transaction x3, and the lightweight node may obtain a Merkle root root4=hash{hash[hash (x4)+N2]+N4} corresponding to the transaction x4. The lightweight node obtains a block Merkle root being Root. When each of root1, root2, root3, and root4 is the same as Root, the lightweight node determines that an accuracy result of the associated transactions is accurate. When root1 is the same as Root, root2 is the same as Root, root3 is different from Root, and root4 is different from Root, the lightweight node determines that the transaction x1 and the transaction x2 are accurate, the transaction x3 and the transaction x4 are inaccurate, and then the lightweight node determines that accuracy of the associated transactions is inaccurate.

Through the foregoing manner, the lightweight node determines the Merkle roots corresponding to the associated transactions based on the associated transactions and the encrypted paths corresponding to the associated transactions, and then checks, according to the Merkle roots corresponding to the associated transactions and the block Merkle root of the associated block, whether the associated transactions are tampered with, that is, determines accuracy of the associated transactions. Therefore, efficient and accurate check may be implemented, to ensure reliability of an accuracy result obtained by check.

In a possible implementation, the lightweight node checks whether the statistical proof transaction list is valid based on the encrypted path of the statistical proof transaction list, and whether the statistical proof transaction list is valid correspondingly represents whether the statistical proof transaction list is tampered with. Specifically, for that the lightweight node checks whether the statistical proof transaction list is valid based on the encrypted path of the statistical proof transaction list, reference may be specifically made to the foregoing performed step that the lightweight node determines accuracy of the associated transactions through the associated transactions and the encrypted path of the associated transactions, and details are not described herein again.

In a possible implementation, when the lightweight node determines by check that the statistical proof transaction list is valid, the lightweight node receives the transaction quantity of associated transactions from the associated block, and searches the statistical proof transaction list for a target statistical proof transaction corresponding to the target index. The lightweight node performs a superposition operation on the transaction quantity and the node address of the lightweight node, to obtain a target superposition value, and performs an encryption operation on the target superposition value through an encryption algorithm, to obtain a target service transaction of the lightweight node; and the lightweight node determines, when the target statistical proof transaction is the same as the target service transaction, that the associated transactions are complete.

For example, it is assumed that the transaction quantity of associated transactions is m1, and the node address of the lightweight node is address1. The lightweight node performs a superposition operation on the transaction quantity and the node address, to obtain a target superposition value being: address1+m1, and then the lightweight node performs a hash operation on the target superposition value through a hash algorithm, to obtain hash(address1+m1). Further, the lightweight node encrypts hash(address1+m1) through a message authentication code (MAC) algorithm, to obtain MAC[hash(address1+m1)], that is, a target service transaction of the lightweight node. FIG. 6B is a schematic diagram of a statistical proof transaction list according to an embodiment of this application. When a target index is 1, the lightweight node obtains a target statistical proof transaction MAC[hash (address1+m1)] in the statistical proof transaction list according to the target index 1. Finally, when the target service transaction is the same as the target statistical proof transaction, it may be determined that the associated transactions are complete, and when the target service transaction is different from the target statistical proof transaction, it may be determined that the associated transactions are incomplete.

Through the foregoing manner, in a case of checking that the statistical proof transaction list is valid, the lightweight node checks, according to the statistical proof transaction list, the target statistical proof transaction related to the lightweight node in the statistical proof transaction list, the transaction quantity, and the node address of the lightweight node, whether the received associated transactions are missing, that is, checks completeness of the associated transactions. Therefore, the completeness may be efficiently and accurately determined, that is, whether the associated transactions are missing may be accurately checked only in need of performing a relatively simplified check process.

Through the method provided in this embodiment of this application, based on the double-layered blockchain network, after synchronizing the associated transactions related to the lightweight node to the full node, the lightweight node may determine, through the associated transactions, the encrypted path set, the statistical proof transaction list, and the encrypted path of the statistical proof transaction list, whether the associated transactions are accurate and whether the associated transactions are complete. Specifically, the lightweight node may determine accuracy of the associated transactions according to the encrypted path set; and may determine completeness of the associated transactions according to the target index, the statistical proof transaction list, and the encrypted path of the statistical proof transaction list. After determining that the associated transactions have validity, the lightweight node may perform subsequent processing based on the associated transactions, and may further improve accuracy of the associated transactions compared with the existing technology in which the lightweight node directly performs subsequent processing according to the associated transactions after obtaining the associated transactions.

Figure 7:
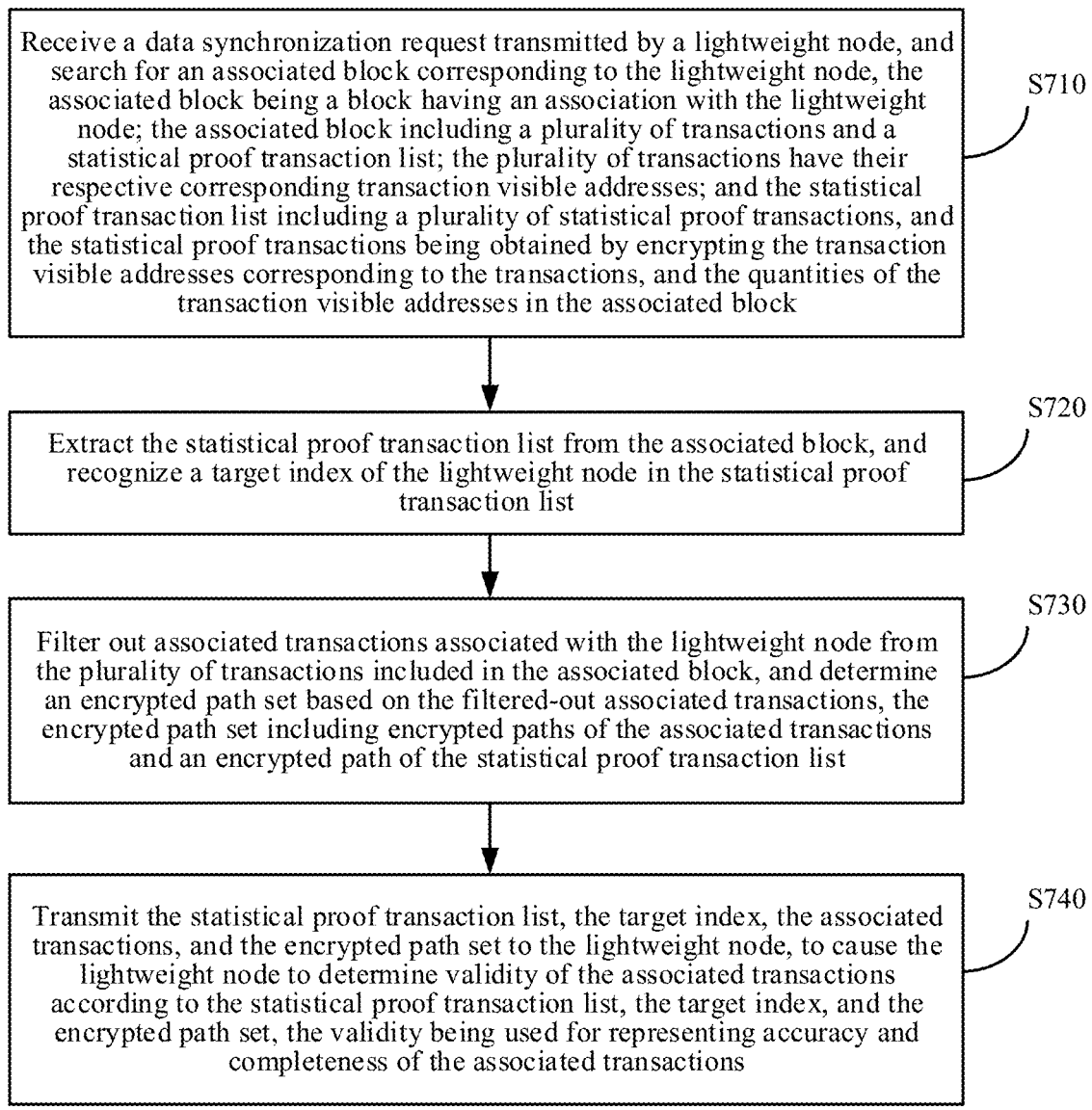
FIG. 7 is a schematic flowchart of another data communication method according to an embodiment of this application.

FIG. 7 is a schematic flowchart of another data communication method according to an embodiment of this application. The method is applied to a blockchain network, the blockchain network includes a first blockchain network and a second blockchain network, the first blockchain network includes a lightweight node, and the second blockchain network includes a full node. Operation steps of the method may be performed by a computer device, and the computer device may be the full node. This embodiment mainly describes a process that the full node responds to a data synchronization request, and the method includes but not limited to the following steps S710 to S740:

Step S710: Receive a data synchronization request transmitted by a lightweight node, and search for an associated block corresponding to the lightweight node, the associated block being a block having an association with the lightweight node; the associated block including a plurality of transactions and a statistical proof transaction list; the plurality of transactions having their respective corresponding transaction visible addresses; and the statistical proof transaction list including a plurality of statistical proof transactions, and the statistical proof transactions being obtained by encrypting the transaction visible addresses corresponding to the transactions, and the quantities of the transaction visible addresses in the associated block.

During specific implementation, the data synchronization request includes identity information of the lightweight node. After receiving the data synchronization request transmitted by the lightweight node, the full node may obtain the identity information of the lightweight node, and check the identity information of the lightweight node; and may obtain the associated block corresponding to the lightweight node when the full node checks the identity information of the lightweight node successfully. For an operation step that the full node checks the identity information of the lightweight node, reference may be specifically made to the specific operation process of the full node in step S420 of the foregoing embodiment in FIG. 4, and details are not described again in this embodiment of this application.

In a possible implementation, the full node receives a to-be-processed transaction, where the to-be-processed transaction includes a plurality of transactions visible addresses; and the full node collects statistics on the quantities of all the transaction visible addresses in the to-be-processed transaction; and then encrypts all the transaction visible addresses and the transaction visible quantities of all the transaction visible addresses, and obtains a statistical proof transaction list.

For example, the full node obtains a to-be-processed transaction initiated by any lightweight node in the first blockchain network. Assuming that a lightweight node A initiates a to-be-processed transaction x1, the lightweight node A may designate lightweight nodes in the first blockchain network which may see the to-be-processed transaction x1, and node addresses corresponding to the designated lightweight nodes are transaction visible addresses. When the lightweight node A designates the lightweight node B and the lightweight node C which can see the to-be-processed transaction x1, assuming that a node address of the lightweight node A is address1, a node address of the lightweight node B is address2, and a node address of the lightweight node C is address3, transaction visible addresses of the to-be-processed transaction x1 are address1, address2, and address3. The rest can be deduced by analogy, and there may be a plurality of to-be-processed transactions.

Through the foregoing manner, the full node generates the statistical proof transaction list according to transaction visible addresses included in to-be-processed transactions and the quantities of the transaction visible addresses; The quantities of all the transaction visible addresses are validly placed into a block, but a related transaction plaintext is not placed into the block, and when obtaining the statistical proof transaction list, any one node in the blockchain network cannot calculate a statistical proof transaction corresponding to each node address because of being lack of all transaction information, thereby ensuring security of data communication between nodes in the blockchain network, and helping the lightweight node check, based on the statistical proof transaction list, whether associated transactions related to the lightweight node are accurate and complete.

In a possible implementation, the statistical proof transaction list includes a first statistical proof transaction and a second statistical proof transaction, and the plurality of transactions visible addresses include a first transaction visible address and a second transaction visible address. The full node encrypts the first transaction visible address and the quantity of the first transaction visible address, and obtains the first statistical proof transaction list; and encrypts the second transaction visible address and the quantity of the second transaction visible address, and obtains the second statistical proof transaction. Then, the full node combines the first statistical proof transaction and the second statistical proof transaction into the statistical proof transaction list, where when occurrence of the first transaction visible address in the to-be-processed transaction precedes occurrence of the second transaction visible address in the to-be-processed transaction, arrangement of the first statistical proof transaction in the statistical proof transaction list precedes arrangement of the second statistical proof transaction in the statistical proof transaction list.

The encryption algorithm used when the full node encrypts the first transaction visible addresses and the quantity of the first transaction visible addresses, to obtain the first statistical proof transaction, and encrypts the second transaction visible addresses and the quantity of the second transaction visible addresses, to obtain the second statistical proof transaction needs to be consistent with the encryption algorithm used when the lightweight node encrypts the target superposition value to obtain the target statistical proof transaction in the embodiment of FIG. 5, that is, first perform a hash operation on the superposition value to obtain a hash value, and then calculate the hash value through the message authentication code algorithm, to obtain each statistical proof transaction. Certainly, the encryption manner is not unique. For example, encryption may be further performed through the HMAC algorithm, as long as the encryption manner is consistent with the manner in which the lightweight node subsequently encrypts the target superposition value. This is not limited in this embodiment of this application.

For example, the full node may collect statistics on the quantities of all the transaction visible addresses according to an occurrence order, that is, the full node sequentially collects statistics on the quantities respectively corresponding to transaction visible addresses address1, address2, address3, address4, and address5. Assuming that the quantities are respectively m1, m2, m3, m4, and m5, a correspondence between transaction visible addresses and quantities may be shown in table 1.1:

TABLE 1.1

| address1 | m1 |
| address2 | m2 |
| address3 | m3 |
| address4 | m4 |
| address5 | m5 |

Then, the full node performs a superposition operation on all the transaction visible addresses and the quantities thereof, to obtain a plurality of superposition values, and then encrypts the plurality of superposition values respectively, to obtain the statistical proof transaction list, where a data structure of the statistical proof transaction list may be a table. When the statistical proof transaction list is generated, it is further necessary to determine a node address corresponding to each statistical proof transaction, and determine an index of each node address in the statistical proof transaction list.

Specifically, the statistical proof transaction list may be shown in table 1.2:

TABLE 1.2

| Index1 | MAC[hash(address1 + m1)] |
| Index2 | MAC[hash(address2 + m2)] |
| Index3 | MAC[hash(address3 + m3)] |
| Index4 | MAC[hash(address4 + m4)] |
| Index5 | MAC[hash(address5 + m5)] |

As shown in table 1.2, an index of a node whose node address is "address1" in the statistical proof transaction list is 1, an index of a node whose node address is "address2" in the statistical proof transaction list is 2, an index of a node whose node address is "address3" in the statistical proof transaction list is 3, an index of a node whose node address is "address4" in the statistical proof transaction list is 4, and an index of a node whose node address is "address5" in the statistical proof transaction list is 5.

Finally, the full node generates an associated block according to the statistical proof transaction list and to-be-processed transactions. Specifically, the full node may use the statistical proof transaction list as a first transaction, then use the to-be-processed transactions sequentially as later transactions of the first transaction, generate the associated block according to all the transactions, and store the associated block in the blockchain, where each to-be-processed transaction stored in the blockchain may be referred to as a transaction.

The full node generates the statistical proof transaction list through the foregoing manner, which may ensure that the statistical proof transactions in the generated statistical proof transaction list are sequenced properly, thereby making it convenient to recognize the target index corresponding to the lightweight node from the statistical proof transaction list and helping improve efficiency with which the lightweight node determines a validity result of the associated transactions.

In a possible implementation, assuming that the full node generating the associated block according to the statistical proof transaction list and the to-be-processed transactions is a first full node, after generating the associated block according to the statistical proof transaction list and the to-be-processed transactions, the first full node may release the associated block to a plurality of second full nodes in the second blockchain network, to cause all the second full nodes to perform a blockchain consensus on the associated block. When the blockchain consensus succeeds, the first full node releases the associated block into the second blockchain network, and stores the associated block in the blockchain. The second full nodes are all nodes in the second blockchain network except the first full node.

In a possible implementation, the full node may obtain the associated block corresponding to the lightweight node through a block height. Specifically, after receiving the data synchronization request transmitted by the lightweight node, the full node may obtain the node address of the lightweight node, and then determine a block stored by the full node and including the node address of the full node in the blockchain, and the full node uses a block corresponding to a maximum block height of blocks including the node address of the lightweight node as the associated block corresponding to the lightweight node.

Step S720: Extract the statistical proof transaction list from the associated block, and recognize a target index of the lightweight node in the statistical proof transaction list.

During specific implementation, the extracting, by the full node, the statistical proof transaction list from the associated block may be using the first transaction extracted from the block body of the associated block as the statistical proof transaction list, and a specific manner in which the full node extracts the target index of the lightweight node in the statistical proof transaction list from the associated block may be that the full node searches the statistical proof transaction list for the target index of the lightweight node in the statistical proof transaction list according to the node address of the lightweight node.

Step S730: Filter out associated transactions associated with the lightweight node from the plurality of transactions included in the associated block, and determine an encrypted path set based on the filtered-out associated transactions, the encrypted path set including encrypted paths of the associated transactions and an encrypted path of the statistical proof transaction list.

During specific implementation, the full node extracts associated transactions associated with the lightweight node from the associated block, and the associated transactions associated with the lightweight node may include a transaction initiated by the lightweight node, a transaction received by the lightweight node, and a transaction witnessed by the lightweight node. For example, assuming that the transaction x1 is initiated by the lightweight node, the transaction x1 may be an associated transaction of the lightweight node; assuming that the transaction x2 is received by the lightweight node, the transaction x2 may be an associated transaction of the lightweight node; if the transaction x3 is initiated by the node 1, but transaction visible addresses of the transaction x3 include the lightweight node, the transaction x3 may also be an associated transaction of the lightweight node. That is to say, the full node may use the node address of the lightweight node as a transaction visible address, and obtain a transaction corresponding to the transaction visible address, that is, an associated transaction of the lightweight node in the associated block, and there may be one or more associated transactions.

Step S740: Transmit the statistical proof transaction list, the target index, the associated transactions, and the encrypted path set to the lightweight node, to cause the lightweight node to determine validity of the associated transactions according to the statistical proof transaction list, the target index, and the encrypted path set, the validity being used for representing accuracy and completeness of the associated transactions.

During specific implementation, the full node in the second blockchain network transmits the statistical proof transaction list, the target index, the associated transactions, and the encrypted path set to the lightweight node in the first blockchain network through a network routing service in the blockchain network. For the operation step in which the lightweight node determines validity of the associated transactions according to the statistical proof transaction list, the target index, and the encrypted path set, reference may be specifically made to the performed step of the lightweight node in step S540 in the embodiment in FIG. 5, and details are not described again in this application.

Through the method provided in this embodiment of this application, after receiving the data synchronization request transmitted by the lightweight node in the first blockchain network, the full node in the second blockchain network may perform identity check on the lightweight node. Only after the full node successfully performs identity check on the lightweight node, the full node transmits data that the lightweight node needs to synchronize and that includes the statistical proof transaction list, the target index, the associated transactions, and the encrypted path set to the lightweight node. In the statistical proof transaction list, the quantities of all the transaction visible addresses are validly placed into a block, but a related transaction plaintext is not placed into the block, and when obtaining the statistical proof transaction list, any one node in the blockchain network cannot calculate a statistical proof transaction corresponding to each node address because of being lack of all transaction information. Therefore, security of data exchange between nodes in the blockchain network may be improved.

Figure 8:
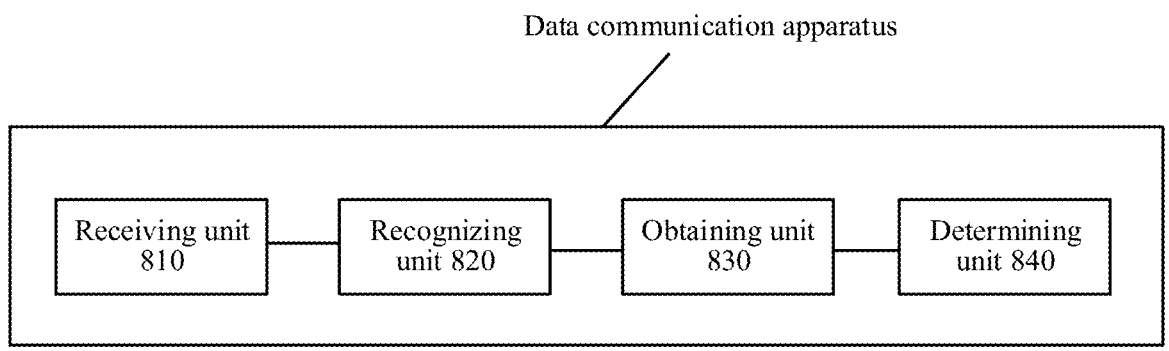
FIG. 8 is a schematic structural diagram of a data communication apparatus according to an embodiment of this application.

FIG. 8 is a schematic structural diagram of a data communication apparatus according to an embodiment of this application. The data communication apparatus may be applied to the lightweight node in the method embodiment corresponding to FIG. 5 to FIG. 6B. The data communication apparatus may be a computer program (including program code) run in the lightweight node, for example, the data communication apparatus is application software; and the apparatus may be used for performing corresponding steps in the method provided in the embodiments of this application. The data communication apparatus may include:

a receiving unit 810, configured to receive data from an associated block having an association with the lightweight node, the data including associated transactions that are associated with the lightweight node and that are in the associated block, and a statistical proof transaction list, the associated block including a plurality of transactions and the statistical proof transaction list, the plurality of transactions having their respective corresponding transaction visible addresses, the statistical proof transaction list including a plurality of statistical proof transactions, and the statistical proof transactions being obtained by encrypting the transaction visible addresses corresponding to the transactions, and the quantities of the transaction visible addresses in the associated block;

a recognizing unit 820, configured to recognize a target index of the lightweight node in the statistical proof transaction list;

an obtaining unit 830, configured to obtain an encrypted path set based on the associated transactions, the encrypted path set including encrypted paths of the associated transactions and an encrypted path of the statistical proof transaction list; and a determining unit 840, configured to determine validity of the associated transactions according to the statistical proof transaction list, the target index, and the encrypted path set, the validity being used for representing accuracy and completeness of the associated transactions.

In a possible implementation, the determining unit 840 is further configured to:

check, based on the encrypted path set, whether the associated transactions are accurate, and obtain the accuracy; and check, based on the target index, the statistical proof transaction list, and the encrypted path of the statistical proof transaction list, whether the associated transactions are complete, and obtain the completeness.

In a possible implementation, there are a plurality of associated transactions, the plurality of associated transactions include a first associated transaction and a second associated transaction, and the encrypted paths of the plurality of associated transactions includes a first encrypted path corresponding to the first associated transaction and a second encrypted path corresponding to the second associated transaction; and the determining unit 840 is further configured to:

determine a first Merkle root according to the first associated transaction and the first encrypted path, and determine a second Merkle root according to the second associated transaction and the second encrypted path; and check, based on the first Merkle root and the second Merkle root, whether the associated transactions are accurate, and obtain the accuracy.

In a possible implementation, the determining unit 840 is further configured to:

receive a block Merkle root of the associated block;

determine, when the first Merkle root, the second Merkle root, and the block Merkle root are all the same as each other, that the associated transactions are accurate; and determine, when at least two Merkle roots of the first Merkle root, the second Merkle root, and the block Merkle root are not the same as each other, that the associated transactions are inaccurate.

In a possible implementation, the determining unit 840 is further configured to:

check, according to the encrypted path of the statistical proof transaction list, whether the statistical proof transaction list is valid;

receive the transaction quantity of the associated transactions from the associated block in a case of checking and determine that the statistical proof transaction list is valid;

search the statistical proof transaction list for a target statistical proof transaction corresponding to the target index; and check, according to the statistical proof transaction list, the target statistical proof transaction, the transaction quantity, and a node address of the lightweight node, whether the associated transactions are complete, and obtain the completeness.

In a possible implementation, the determining unit 840 is further configured to:

perform a superposition operation on the transaction quantity and the node address of the lightweight node, to obtain a target superposition value, and perform an encryption operation on the target superposition value through an encryption algorithm, to obtain a target service transaction of the lightweight node; and determine, when the target statistical proof transaction is the same as the target service transaction, that the associated transactions are complete.

Through the data communication apparatus provided in this embodiment of this application, based on the double-layered blockchain network, after synchronizing the associated transactions related to the lightweight node to the full node, the lightweight node may determine the validity result of the associated transactions through the associated transactions, the encrypted path set, the statistical proof transaction list, and the encrypted path of the statistical proof transaction list. Specifically, the lightweight node may determine accuracy of the associated transactions according to the encrypted path set; and determine completeness of the associated transactions according to the target index, the statistical proof transaction list, and the encrypted path of the statistical proof transaction list. After determining validity of the associated transactions, the lightweight node may perform subsequent processing according to the associated transactions based on the validity, and may further improve accuracy of the associated transactions compared with the existing technology in which the lightweight node directly performs subsequent processing according to the associated transactions after obtaining the associated transactions.

Figure 9:
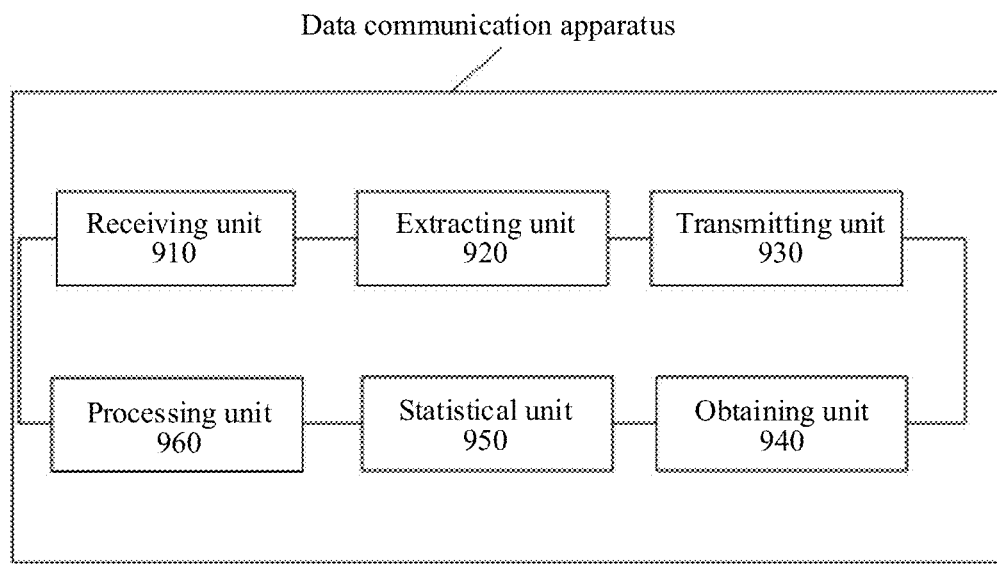
FIG. 9 is a schematic structural diagram of another data communication apparatus according to an embodiment of this application.

FIG. 9 is a schematic structural diagram of a data communication apparatus according to an embodiment of this application. The data communication apparatus may be applied to the full node in the method embodiment corresponding to FIG. 7. The data communication apparatus may be a computer program (including program code) run in the full node, for example, the data communication apparatus is application software; and the apparatus may be used for performing corresponding steps in the method provided in the embodiments of this application. The data communication apparatus may include:

a receiving unit 910, configured to receive a data synchronization request transmitted by a lightweight node, and search for an associated block corresponding to the lightweight node, the associated block being a block having an association with the lightweight node; the associated block including a plurality of transactions and a statistical proof transaction list; the plurality of transactions having their respective corresponding transaction visible addresses; and the statistical proof transaction list including a plurality of statistical proof transactions, and the statistical proof transactions being obtained by encrypting the transaction visible addresses corresponding to the transactions, and the quantities of the transaction visible addresses in the associated block;

an extracting unit 920, configured to extract the statistical proof transaction list from the associated block, and recognize a target index of the lightweight node in the statistical proof transaction list;

the extracting unit 920 being further configured to filter out associated transactions associated with the lightweight node from the plurality of transactions included in the associated block, and determine an encrypted path set based on the filtered-out associated transactions, the encrypted path set including encrypted paths of the associated transactions and an encrypted path of the statistical proof transaction list; and a transmitting unit 930, configured to transmit the statistical proof transaction list, the target index, the associated transactions, and the encrypted path set to the lightweight node, to cause the lightweight node to determine validity of the associated transactions according to the statistical proof transaction list, the target index, and the encrypted path set, the validity being used for representing accuracy and completeness of the associated transactions.

In a possible implementation, the data communication apparatus further includes: an obtaining unit 940, a statistical unit 950, and a processing unit 960.

The obtaining unit 940 is configured to receive a to-be-processed transaction, where the to-be-processed transaction includes a plurality of transactions visible addresses;

the statistical unit 950 is configured to collect statistics on the quantities of all the transaction visible addresses in the to-be-processed transaction;

the processing unit 960 is configured to encrypt all the transaction visible addresses and the quantities of all the transaction visible addresses respectively, and obtain the statistical proof transaction list; and the processing unit 960 is further configured to generate the associated block according to the statistical proof transaction list and the to-be-processed transaction, and store the associated block storage in a blockchain.

In a possible implementation, the statistical proof transaction list includes a first statistical proof transaction and a second statistical proof transaction, and the plurality of transactions visible addresses include a first transaction visible address and a second transaction visible address; and the processing unit 960 is further configured to:

encrypt the first transaction visible address and the quantity of the first transaction visible address, and obtain the first statistical proof transaction list;

encrypt the second transaction visible address and the quantity of the second transaction visible address, and obtain the second statistical proof transaction; and combine the first statistical proof transaction and the second statistical proof transaction into the statistical proof transaction list, where when occurrence of the first transaction visible address in the to-be-processed transaction precedes occurrence of the second transaction visible address in the to-be-processed transaction, arrangement of the first statistical proof transaction in the statistical proof transaction list precedes arrangement of the second statistical proof transaction in the statistical proof transaction list.

In a possible implementation, the data synchronization request includes identity information of the lightweight node; and the transmitting, by the transmitting unit 930, the statistical proof transaction list, the target index, the associated transactions, and the encrypted path set to the lightweight node includes:

checking the identity information of the lightweight node; and transmitting, when the identity information is checked successfully, the statistical proof transaction list, the target index, the associated transactions, and the encrypted path set to the lightweight node.

In a possible implementation, blockchain networks corresponding to the blockchain include a first blockchain network and a second blockchain network, the lightweight node is a node in the first blockchain network, the lightweight node is used for storing associated transactions of the lightweight node, the full node is used for storing the blockchain, and the blockchain includes associated transactions of all nodes in the first blockchain network.

Through the data communication apparatus provided in this embodiment of this application, in response to the data synchronization request transmitted by the lightweight node in the first blockchain network, the full node in the second blockchain network may perform identity check on the lightweight node. After the full node successfully performs identity check on the lightweight node, the full node transmits data that the lightweight node needs to synchronize and that includes the statistical proof transaction list, the target index, the associated transactions, and the encrypted path set to the lightweight node. In the statistical proof transaction list, the quantities of the transaction visible addresses are validly placed into a block, but a related transaction plaintext is not placed into the block, and when obtaining the statistical proof transaction list, any one node in the blockchain network cannot calculate a statistical proof transaction corresponding to each node address because of being lack of all transaction information. Therefore, security of data exchange between nodes in the blockchain network may be improved.

Figure 10:
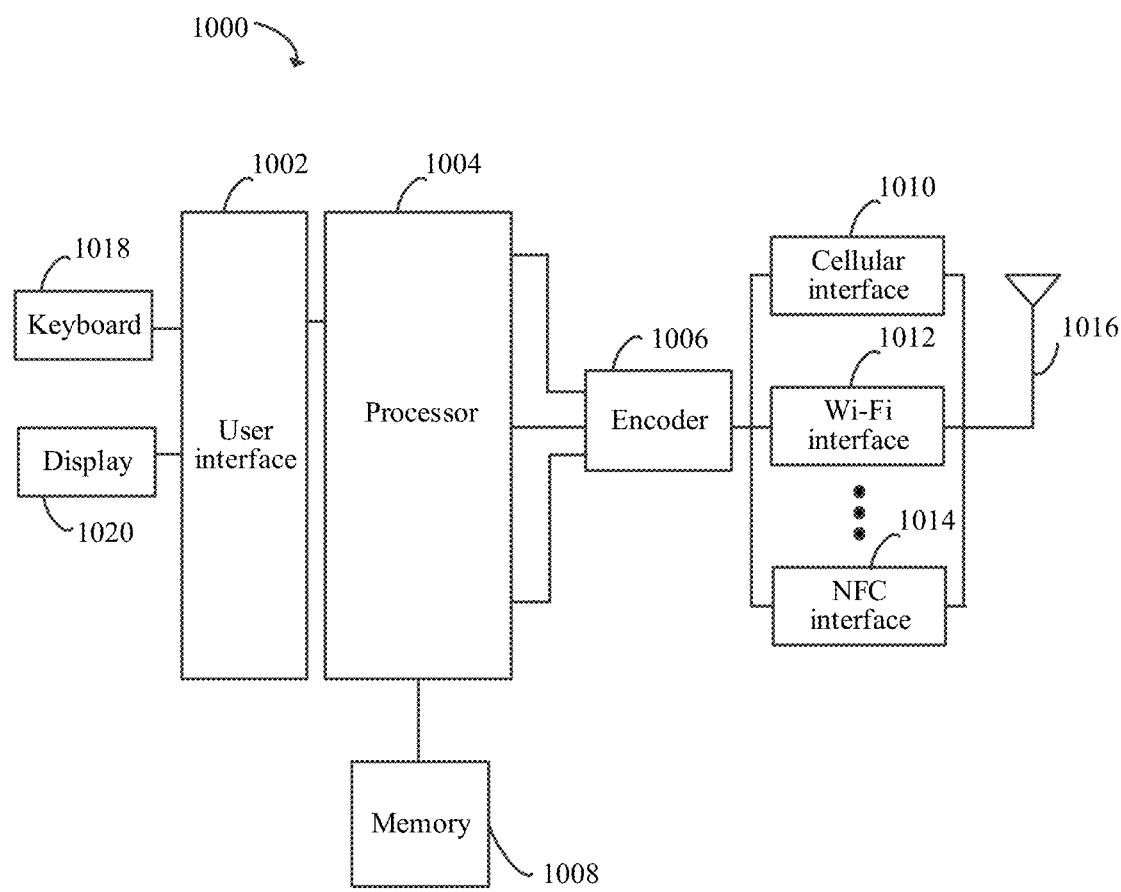
FIG. 10 is a schematic structural diagram of a computer device according to an embodiment of this application.

FIG. 10 is a schematic structural diagram of a computer device according to an embodiment of this application. The lightweight node in the embodiments corresponding to FIG. 4 to FIG. 7 may be a computer device 1000. As shown in FIG. 10, the computer device 1000 may include: a user interface 1002, a processor 1004, an encoder 1006, and a memory 1008. A signal receiver 1016 is configured to receive or transmit data by using a cellular interface 1010, a Wi-Fi interface 1012, . . . , or an NFC interface 1014. The encoder 1006 encodes the received data into a data format processed by a computer. The memory 1008 stores a computer program, and the processor 1004 is configured to perform steps in any one of the method embodiments through the computer program. The memory 1008 may include a volatile memory (for example, a dynamic random access memory (DRAM)), and may further include a non-volatile memory (for example, a one-time programmable read-only memory (OTPROM)). In some examples, the memory 1008 may further include memories remotely disposed relative to the processor 1004, and these remote memories may be connected to the computer device 1000 through a network. The user interface 1002 may include: a keyboard 1018 and a display 1020.

In the computer device 1000 shown in FIG. 10, the processor 1004 may be configured to invoke the computer program stored in the memory 1008, to implement the lightweight-node-side data communication method in the foregoing method embodiments or the full-node-side data communication method in the foregoing method embodiments.

It is to be understood that the computer device 1000 described in this embodiment of this application can perform the data communication method in the foregoing embodiments corresponding to FIG. 4 to FIG. 7, and can also perform steps performed by the data communication apparatus in the foregoing embodiments corresponding to FIG. 8 and FIG. 9. Details are not repeated herein. In addition, beneficial effects achieved by using the same method are not described herein again.

In addition, an embodiment of this application further provides a computer storage medium. The computer storage medium stores a computer program executed by the data communication apparatus mentioned above, and the computer program includes program instructions. When executing the program instructions, the processor can perform the descriptions of the method in the embodiments corresponding to FIG. 4 to FIG. 7. Therefore, details are not described herein again. In addition, beneficial effects achieved by using the same method are not described herein again. For technical details that are not disclosed in the embodiment of the computer storage medium of this application, refer to the descriptions of the method embodiments of this application. In an example, the program instructions may be deployed to be executed on a computer device, or deployed to be executed on a plurality of computer devices at the same location, or deployed to be executed on a plurality of computer devices that are distributed in a plurality of locations and interconnected by using a communication network. The plurality of computer devices that are distributed in the plurality of locations and interconnected by using the communication network may form a blockchain system.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium. The processor executes the computer instructions, to enable the computer device to perform the method in the foregoing embodiments corresponding to FIG. 4 to FIG. 7. Therefore, details are not described herein again.

Persons of ordinary skill in the art may understand that all or some of the procedures of the methods in the embodiments may be implemented by using a computer program instructing relevant hardware. The program may be stored in a computer-readable storage medium. When the program runs, the procedures of the methods in the embodiments are performed. The foregoing storage medium may be a magnetic disk, an optical disc, a read-only memory (ROM), a random access memory (RAM), or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely some embodiments of this application, and are not intended to limit the scope of this application. A person skilled in the art may understand all or some processes of the foregoing embodiments, and equivalent modifications made according to the claims of this application shall still fall within the scope of the present disclosure.

What is claimed is:

1. A data communication method, performed by a computer device acting as a lightweight node of a blockchain data network, the method comprising:
 receiving data from an associated block having an association with the lightweight node, the data comprising a plurality of transactions that are associated with the lightweight node and that are in the associated block, and a statistical proof transaction list, each of the plurality of transactions having their respective corresponding transaction visible addresses of lightweight nodes that can access the transaction, the statistical proof transaction list comprising a plurality of statistical proof transactions, each of the plurality of statistical proof transactions indicating a quantity of transactions that are visible to a lightweight node represented by a corresponding transaction visible address, and the plurality of statistical proof transactions being obtained by encrypting the transaction visible addresses corresponding to the transaction nodes, and the quantities of the transaction visible addresses in the associated block;

recognizing a target index of the lightweight node in the statistical proof transaction list;

obtaining an encrypted path set based on the associated transactions, the encrypted path set comprising encrypted paths of the associated transactions and an encrypted path of the statistical proof transaction list; and determining validity of the associated transactions according to the statistical proof transaction list, the target index, and the encrypted path set, the validity being used for representing accuracy and completeness of the associated transactions, further including:

checking, based on the encrypted path set, whether the associated transactions are accurate, and obtaining the accuracy indicating that content related to the associated transactions is not tampered with; and checking, based on the target index, the statistical proof transaction list, and the encrypted path of the statistical proof transaction list, whether the associated transactions are complete, and obtaining the completeness indicating that no content related to the associated transactions is missing.

2. The method according to claim 1, wherein there are a plurality of associated transactions, the plurality of associated transactions comprise a first associated transaction and a second associated transaction, and the encrypted paths of the plurality of associated transactions comprises a first encrypted path corresponding to the first associated transaction and a second encrypted path corresponding to the second associated transaction; and the checking, based on the encrypted path set, whether the associated transactions are accurate, and obtaining the accuracy comprises:

determining a first Merkle root according to the first associated transaction and the first encrypted path;

determining a second Merkle root according to the second associated transaction and the second encrypted path; and checking, based on the first Merkle root and the second Merkle root, whether the associated transactions are accurate, and obtaining the accuracy.

3. The method according to claim 2, wherein the checking, based on the first Merkle root and the second Merkle root, whether the associated transactions are accurate, and obtaining the accuracy comprises:

receiving a block Merkle root of the associated block;

determining, when the first Merkle root, the second Merkle root, and the block Merkle root are all the same as each other, that the associated transactions are accurate; and determining, when at least two Merkle roots of the first Merkle root, the second Merkle root, and the block Merkle root are not the same as each other, that the associated transactions are inaccurate.

4. The method according to claim 1, wherein the checking, based on the target index, the statistical proof transaction list, and the encrypted path of the statistical proof transaction list, whether the associated transactions are complete, and obtaining the completeness comprises:

checking, according to the encrypted path of the statistical proof transaction list, whether the statistical proof transaction list is valid;

receiving the transaction quantity of the associated transactions from the associated block in a case of checking and determining that the statistical proof transaction list is valid;

searching the statistical proof transaction list for a target statistical proof transaction corresponding to the target index; and checking, according to the statistical proof transaction list, the target statistical proof transaction, the transaction quantity, and a node address of the lightweight node, whether the associated transactions are complete, and obtaining the completeness.

5. The method according to claim 4, wherein the checking, according to the statistical proof transaction list, the target statistical proof transaction, the transaction quantity, and a node address of the lightweight node, whether the associated transactions are complete, and obtaining the completeness comprises:

performing a superposition operation on the transaction quantity and the node address of the lightweight node, to obtain a target superposition value, and performing an encryption operation on the target superposition value through an encryption algorithm, to obtain a target service transaction of the lightweight node; and determining, when the target statistical proof transaction is the same as the target service transaction, that the associated transactions are complete.

6. A computer device acting as a lightweight node of a blockchain data network, comprising a memory and a processor, the memory storing a set of program code that, when executed by the processor, cause the computer device to perform a data communication method including:

receiving data from an associated block having an association with the lightweight node, the data comprising a plurality of transactions that are associated with the lightweight node and that are in the associated block, and a statistical proof transaction list, each of the plurality of transactions having their respective corresponding transaction visible addresses of lightweight nodes that can access the transaction, the statistical proof transaction list comprising a plurality of statistical proof transactions, each of the plurality of statistical proof transactions indicating a quantity of transactions that are visible to a lightweight node represented by a corresponding transaction visible address, and the plurality of statistical proof transactions being obtained by encrypting the transaction visible addresses corresponding to the transaction nodes, and the quantities of the transaction visible addresses in the associated block;

recognizing a target index of the lightweight node in the statistical proof transaction list;

obtaining an encrypted path set based on the associated transactions, the encrypted path set comprising encrypted paths of the associated transactions and an encrypted path of the statistical proof transaction list; and determining validity of the associated transactions according to the statistical proof transaction list, the target index, and the encrypted path set, the validity being used for representing accuracy and completeness of the associated transactions, further including:
checking, based on the encrypted path set, whether the associated transactions are accurate, and obtaining the accuracy indicating that content related to the associated transactions is not tampered with; and
checking, based on the target index, the statistical proof transaction list, and the encrypted path of the statistical proof transaction list, whether the associated transactions are complete, and obtaining the completeness indicating that no content related to the associated transactions is missing.

7. The computer device according to claim 6, wherein there are a plurality of associated transactions, the plurality of associated transactions comprise a first associated transaction and a second associated transaction, and the encrypted paths of the plurality of associated transactions comprises a first encrypted path corresponding to the first associated transaction and a second encrypted path corresponding to the second associated transaction; and
the checking, based on the encrypted path set, whether the associated transactions are accurate, and obtaining the accuracy comprises:
determining a first Merkle root according to the first associated transaction and the first encrypted path;
determining a second Merkle root according to the second associated transaction and the second encrypted path; and
checking, based on the first Merkle root and the second Merkle root, whether the associated transactions are accurate, and obtaining the accuracy.

8. The computer device according to claim 7, wherein the checking, based on the first Merkle root and the second Merkle root, whether the associated transactions are accurate, and obtaining the accuracy comprises:
receiving a block Merkle root of the associated block;
determining, when the first Merkle root, the second Merkle root, and the block Merkle root are all the same as each other, that the associated transactions are accurate; and
determining, when at least two Merkle roots of the first Merkle root, the second Merkle root, and the block Merkle root are not the same as each other, that the associated transactions are inaccurate.

9. The computer device according to claim 6, wherein the checking, based on the target index, the statistical proof transaction list, and the encrypted path of the statistical proof transaction list, whether the associated transactions are complete, and obtaining the completeness comprises:
checking, according to the encrypted path of the statistical proof transaction list, whether the statistical proof transaction list is valid;
receiving the transaction quantity of the associated transactions from the associated block in a case of checking and determining that the statistical proof transaction list is valid;
searching the statistical proof transaction list for a target statistical proof transaction corresponding to the target index; and
checking, according to the statistical proof transaction list, the target statistical proof transaction, the transaction quantity, and a node address of the lightweight node, whether the associated transactions are complete, and obtaining the completeness.

10. The computer device according to claim 9, wherein the checking, according to the statistical proof transaction list, the target statistical proof transaction, the transaction quantity, and a node address of the lightweight node, whether the associated transactions are complete, and obtaining the completeness comprises:
performing a superposition operation on the transaction quantity and the node address of the lightweight node, to obtain a target superposition value, and performing an encryption operation on the target superposition value through an encryption algorithm, to obtain a target service transaction of the lightweight node; and
determining, when the target statistical proof transaction is the same as the target service transaction, that the associated transactions are complete.

11. A non-transitory computer-readable storage medium, storing a computer program, the computer program comprising program instructions that, when executed by a processor of a computer device acting as a lightweight node of a blockchain data network, cause the computer device to perform a data communication method including:
receiving data from an associated block having an association with the lightweight node, the data comprising a plurality of transactions that are associated with the lightweight node and that are in the associated block, and a statistical proof transaction list, each of the plurality of transactions having their respective corresponding transaction visible addresses of lightweight nodes that can access the transaction, the statistical proof transaction list comprising a plurality of statistical proof transactions, each of the plurality of statistical proof transactions indicating a quantity of transactions that are visible to a lightweight node represented by a corresponding transaction visible address, and the plurality of statistical proof transactions being obtained by encrypting the transaction visible addresses corresponding to the transaction nodes, and the quantities of the transaction visible addresses in the associated block;
recognizing a target index of the lightweight node in the statistical proof transaction list;
obtaining an encrypted path set based on the associated transactions, the encrypted path set comprising encrypted paths of the associated transactions and an encrypted path of the statistical proof transaction list; and
determining validity of the associated transactions according to the statistical proof transaction list, the target index, and the encrypted path set, the validity being used for representing accuracy and completeness of the associated transactions, further including:
checking, based on the encrypted path set, whether the associated transactions are accurate, and obtaining the accuracy indicating that content related to the associated transactions is not tampered with; and
checking, based on the target index, the statistical proof transaction list, and the encrypted path of the statistical proof transaction list, whether the associated transactions are complete, and obtaining the completeness indicating that no content related to the associated transactions is missing.

12. The non-transitory computer-readable storage medium according to claim 11, wherein there are a plurality of associated transactions, the plurality of associated transactions comprise a first associated transaction and a second associated transaction, and the encrypted paths of the plurality of associated transactions comprises a first encrypted path corresponding to the first associated transaction and a second encrypted path corresponding to the second associated transaction; and the checking, based on the encrypted path set, whether the associated transactions are accurate, and obtaining the accuracy comprises:
determining a first Merkle root according to the first associated transaction and the first encrypted path;
determining a second Merkle root according to the second associated transaction and the second encrypted path; and
checking, based on the first Merkle root and the second Merkle root, whether the associated transactions are accurate, and obtaining the accuracy.

13. The non-transitory computer-readable storage medium according to claim 12, wherein the checking, based on the first Merkle root and the second Merkle root, whether the associated transactions are accurate, and obtaining the accuracy comprises:
receiving a block Merkle root of the associated block;
determining, when the first Merkle root, the second Merkle root, and the block Merkle root are all the same as each other, that the associated transactions are accurate; and
determining, when at least two Merkle roots of the first Merkle root, the second Merkle root, and the block Merkle root are not the same as each other, that the associated transactions are inaccurate.

14. The non-transitory computer-readable storage medium according to claim 11, wherein the checking, based on the target index, the statistical proof transaction list, and the encrypted path of the statistical proof transaction list, whether the associated transactions are complete, and obtaining the completeness comprises:
checking, according to the encrypted path of the statistical proof transaction list, whether the statistical proof transaction list is valid;
receiving the transaction quantity of the associated transactions from the associated block in a case of checking and determining that the statistical proof transaction list is valid;
searching the statistical proof transaction list for a target statistical proof transaction corresponding to the target index; and
checking, according to the statistical proof transaction list, the target statistical proof transaction, the transaction quantity, and a node address of the lightweight node, whether the associated transactions are complete, and obtaining the completeness.

15. The non-transitory computer-readable storage medium according to claim 14, wherein the checking, according to the statistical proof transaction list, the target statistical proof transaction, the transaction quantity, and a node address of the lightweight node, whether the associated transactions are complete, and obtaining the completeness comprises:
performing a superposition operation on the transaction quantity and the node address of the lightweight node, to obtain a target superposition value, and performing an encryption operation on the target superposition value through an encryption algorithm, to obtain a target service transaction of the lightweight node; and
determining, when the target statistical proof transaction is the same as the target service transaction, that the associated transactions are complete.

* * * * *